United States Patent
Bernstein et al.

(10) Patent No.: US 10,313,297 B2
(45) Date of Patent: *Jun. 4, 2019

(54) E-MAIL INTEGRATED INSTANT MESSAGING

(71) Applicant: Facebook, Inc., Menlo Park, CA (US)

(72) Inventors: Keith Bernstein, San Francisco, CA (US); Alan Chung, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/188,381

(22) Filed: Jun. 21, 2016

(65) Prior Publication Data

US 2016/0301654 A1 Oct. 13, 2016

Related U.S. Application Data

(63) Continuation of application No. 15/143,111, filed on Apr. 29, 2016, now abandoned, which is a continuation of application No. 13/620,985, filed on Sep. 15, 2012, now Pat. No. 9,363,213, which is a continuation of application No. 13/175,410, filed on
(Continued)

(51) Int. Cl.
| | |
|---|---|
| *G06F 15/16* | (2006.01) |
| *H04L 12/58* | (2006.01) |
| *G06Q 10/10* | (2012.01) |
| *H04L 29/06* | (2006.01) |
| *H04L 29/08* | (2006.01) |
| *H04L 12/18* | (2006.01) |

(52) U.S. Cl.
CPC ............ *H04L 51/36* (2013.01); *G06Q 10/107* (2013.01); *H04L 51/04* (2013.01); *H04L 51/046* (2013.01); *H04L 51/22* (2013.01); *H04L 65/1013* (2013.01); *H04L 65/1069* (2013.01); *H04L 67/02* (2013.01); *H04L 12/1818* (2013.01)

(58) Field of Classification Search
CPC ..... H04L 51/36; H04L 65/1013; H04L 67/02; H04L 65/1069; H04L 51/046; H04L 51/22; H04L 51/04; H04L 12/1818; G06Q 10/107
See application file for complete search history.

(56) References Cited

U.S. PATENT DOCUMENTS

| | | |
|---|---|---|
| 4,837,798 A | 6/1989 | Cohen et al. |
| 5,086,394 A | 2/1992 | Shapira |

(Continued)

FOREIGN PATENT DOCUMENTS

| | | |
|---|---|---|
| EP | 0862304 | 9/1998 |
| EP | 1176840 | 1/2002 |

(Continued)

OTHER PUBLICATIONS

U.S. Appl. No. 15/237,883, Feb. 1, 2018, Office Action.
(Continued)

*Primary Examiner* — John B Walsh
(74) *Attorney, Agent, or Firm* — Keller Jolley Preece

(57) ABSTRACT

A system and method supporting instant messaging which removes many of the problems and barriers to the use of instant messaging through the use of universally unique identifiers to web pages for instant messaging sessions, with recipients invited to the instant messaging session via email.

20 Claims, 13 Drawing Sheets

Related U.S. Application Data

Jul. 1, 2011, now Pat. No. 9,628,431, which is a continuation of application No. 10/311,259, filed as application No. PCT/US01/20381 on Jun. 25, 2001, now Pat. No. 8,001,190.

(60) Provisional application No. 60/214,157, filed on Jun. 26, 2000.

(56) References Cited

U.S. PATENT DOCUMENTS

| | | |
|---|---|---|
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,583,920 A | 12/1996 | Wheeler, Jr. |
| 5,608,786 A | 3/1997 | Gordon |
| 5,610,910 A | 3/1997 | Focsaneanu et al. |
| 5,650,994 A | 7/1997 | Daley |
| 5,694,616 A | 12/1997 | Johnson et al. |
| 5,721,906 A | 2/1998 | Siefert |
| 5,742,905 A | 4/1998 | Pepe et al. |
| 5,764,916 A | 6/1998 | Busey et al. |
| 5,765,033 A | 6/1998 | Miloslavsky |
| 5,774,670 A | 6/1998 | Montulli |
| 5,790,800 A | 8/1998 | Gauvin et al. |
| 5,793,365 A | 8/1998 | Tang et al. |
| 5,802,470 A | 9/1998 | Gaulke et al. |
| 5,835,724 A | 11/1998 | Smith |
| 5,838,458 A | 11/1998 | Tsai |
| 5,848,134 A | 12/1998 | Sekiguchi et al. |
| 5,850,594 A | 12/1998 | Cannon et al. |
| 5,859,979 A | 1/1999 | Tung et al. |
| 5,867,162 A | 2/1999 | O'Leary et al. |
| 5,870,549 A | 2/1999 | Bobo, II |
| 5,870,744 A | 2/1999 | Sprague |
| 5,872,521 A | 2/1999 | Loptaukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,919,247 A | 7/1999 | Van Hoff et al. |
| 5,920,692 A | 7/1999 | Nguyen et al. |
| 5,940,488 A | 8/1999 | DeGrazia et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,646 A | 9/1999 | Brandon |
| 5,951,652 A | 9/1999 | Ingrassia, Jr. et al. |
| 5,954,798 A | 9/1999 | Shelton et al. |
| 5,956,716 A | 9/1999 | Kenner et al. |
| 5,960,173 A | 9/1999 | Tang et al. |
| 5,974,446 A | 10/1999 | Sonnenreich et al. |
| 5,983,369 A | 11/1999 | Bakoglu et al. |
| 5,987,407 A | 11/1999 | Wu et al. |
| 5,991,791 A | 11/1999 | Siefert |
| 5,995,023 A | 11/1999 | Kreft |
| 6,002,402 A | 12/1999 | Schacher |
| 6,006,179 A | 12/1999 | Wu et al. |
| 6,009,413 A | 12/1999 | Webber et al. |
| 6,009,462 A | 12/1999 | Birrell et al. |
| 6,012,051 A | 1/2000 | Sammon, Jr. et al. |
| 6,014,135 A | 1/2000 | Fernandes |
| 6,014,638 A | 1/2000 | Burge et al. |
| 6,018,571 A | 1/2000 | Langlois et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,067,548 A | 5/2000 | Cheng |
| 6,070,171 A | 5/2000 | Snyder et al. |
| 6,073,138 A | 6/2000 | De l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,122,647 A | 9/2000 | Horowitz et al. |
| 6,134,432 A | 10/2000 | Holmes et al. |
| 6,144,991 A | 11/2000 | England |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,175,859 B1 | 1/2001 | Mohler |
| 6,189,019 B1 | 2/2001 | Blumer et al. |
| 6,192,395 B1 | 2/2001 | Lerner et al. |
| 6,195,354 B1 | 2/2001 | Skalecki et al. |
| 6,199,103 B1 | 3/2001 | Sakaguchi et al. |
| 6,208,659 B1 | 3/2001 | Govindarajan et al. |
| 6,212,548 B1 | 4/2001 | DeSimone et al. |
| 6,212,550 B1 | 4/2001 | Segur |
| 6,223,213 B1 | 4/2001 | Cleron et al. |
| 6,233,318 B1 | 5/2001 | Picard et al. |
| 6,233,577 B1 | 5/2001 | Ramasubramani et al. |
| 6,240,430 B1 | 5/2001 | Deike et al. |
| 6,249,740 B1 | 6/2001 | Ito et al. |
| 6,249,743 B1 | 6/2001 | Oshimo |
| 6,260,148 B1 | 7/2001 | Aggarwal et al. |
| 6,269,369 B1 | 7/2001 | Robertson |
| 6,269,405 B1 | 7/2001 | Dutcher et al. |
| 6,301,609 B1 | 10/2001 | Aravamudan et al. |
| 6,311,211 B1 | 10/2001 | Shaw |
| 6,313,855 B1 | 11/2001 | Shuping et al. |
| 6,314,450 B1 | 11/2001 | Hachiya et al. |
| 6,317,776 B1 | 11/2001 | Broussard et al. |
| 6,324,541 B1 | 11/2001 | De l'Etraz et al. |
| 6,330,590 B1 | 12/2001 | Cotten |
| 6,347,332 B1 | 2/2002 | Malet et al. |
| 6,351,698 B1 | 2/2002 | Kubtoa et al. |
| 6,353,825 B1 | 3/2002 | Ponte |
| 6,356,922 B1 | 3/2002 | Schilit et al. |
| 6,360,215 B1 | 3/2002 | Judd et al. |
| 6,363,392 B1 | 3/2002 | Halstead et al. |
| 6,366,950 B1 | 4/2002 | Scheussler et al. |
| 6,370,497 B1 | 4/2002 | Knowles |
| 6,374,246 B1 | 4/2002 | Matsuo |
| 6,374,290 B1 | 4/2002 | Scharber et al. |
| 6,381,593 B1 | 4/2002 | Yano et al. |
| 6,389,127 B1 | 5/2002 | Vardi et al. |
| 6,389,372 B1 | 5/2002 | Glance et al. |
| 6,393,464 B1 | 5/2002 | Dieterman |
| 6,400,381 B1 | 6/2002 | Barrett et al. |
| 6,400,845 B1 | 6/2002 | Volino |
| 6,405,035 B1 | 6/2002 | Singh |
| 6,405,249 B1 | 6/2002 | Matsuda et al. |
| 6,408,316 B1 | 6/2002 | Himmel et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,424,828 B1 | 7/2002 | Collins et al. |
| 6,425,012 B1 | 7/2002 | Trovato et al. |
| 6,430,344 B1 | 8/2002 | Dixon et al. |
| 6,430,604 B1 | 8/2002 | Ogle et al. |
| 6,434,601 B1 | 8/2002 | Rollins |
| 6,442,546 B1 | 8/2002 | Biliris et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,463,461 B1 | 10/2002 | Hanson et al. |
| 6,467,080 B1 | 10/2002 | Devine et al. |
| 6,480,885 B1 | 11/2002 | Olivier |
| 6,484,196 B1 | 11/2002 | Maurille |
| 6,493,692 B1 | 12/2002 | Kobayashi et al. |
| 6,493,705 B1 | 12/2002 | Kobayashi et al. |
| 6,501,834 B1 | 12/2002 | Milewski et al. |
| 6,505,197 B1 | 1/2003 | Sundaresan et al. |
| 6,507,845 B1 | 1/2003 | Cohen et al. |
| 6,507,866 B1 | 1/2003 | Barchi |
| 6,519,602 B2 | 2/2003 | Sundaresan et al. |
| 6,525,747 B1 | 2/2003 | Bezos |
| 6,526,400 B1 | 2/2003 | Takata et al. |
| 6,529,475 B1 | 3/2003 | Wan et al. |
| 6,535,586 B1 | 3/2003 | Cloutier et al. |
| 6,539,421 B1 | 3/2003 | Appelman et al. |
| 6,545,722 B1 | 4/2003 | Schultheiss et al. |

(56) References Cited

U.S. PATENT DOCUMENTS

| | | |
|---|---|---|
| 6,546,002 B1 | 4/2003 | Kim |
| 6,549,937 B1 | 4/2003 | Auerbach et al. |
| 6,557,027 B1 | 4/2003 | Cragun |
| 6,559,863 B1 | 5/2003 | Megiddo |
| 6,564,248 B1 | 5/2003 | Budge et al. |
| 6,564,261 B1 | 5/2003 | Gudjonsson et al. |
| 6,567,801 B1 | 5/2003 | Chiang et al. |
| 6,571,234 B1 | 5/2003 | Knight et al. |
| 6,574,599 B1 | 6/2003 | Lim et al. |
| 6,580,790 B1 | 6/2003 | Henry et al. |
| 6,584,469 B1 | 6/2003 | Chiang et al. |
| 6,587,691 B1 | 7/2003 | Granstam et al. |
| 6,606,647 B2 | 8/2003 | Shah et al. |
| 6,615,241 B1 | 9/2003 | Miller et al. |
| 6,618,747 B1 | 9/2003 | Flynn et al. |
| 6,636,733 B1 | 10/2003 | Helferich |
| 6,640,230 B1 | 10/2003 | Alexander et al. |
| 6,651,058 B1 | 11/2003 | Sundaresan et al. |
| 6,654,683 B2 | 11/2003 | Jin et al. |
| 6,654,741 B1 | 11/2003 | Cohen et al. |
| 6,658,623 B1 | 12/2003 | Schilit et al. |
| 6,665,665 B1 | 12/2003 | Ponte |
| 6,671,508 B1 | 12/2003 | Mitsuoka et al. |
| 6,671,714 B1 | 12/2003 | Weyer |
| 6,677,968 B1 | 1/2004 | Appelman |
| 6,677,976 B2 | 1/2004 | Parker et al. |
| 6,678,719 B1 | 1/2004 | Stimmel |
| 6,685,475 B1 | 2/2004 | Maruyama et al. |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,718,313 B1 | 4/2004 | Lent et al. |
| 6,731,308 B1 | 5/2004 | Tang et al. |
| 6,732,155 B2 | 5/2004 | Meek |
| 6,738,822 B2 | 5/2004 | Fukasawa et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,751,777 B2 | 6/2004 | Bates et al. |
| 6,757,365 B1 | 6/2004 | Bogard |
| 6,757,732 B1 | 6/2004 | Sollee et al. |
| 6,763,373 B2 | 7/2004 | Shiigi |
| 6,772,188 B1 | 8/2004 | Cloutier |
| 6,772,196 B1 | 8/2004 | Kirsch et al. |
| 6,781,608 B1 | 8/2004 | Crawford |
| 6,785,554 B1 | 8/2004 | Amerga |
| 6,785,681 B2 | 8/2004 | Keskar et al. |
| 6,788,769 B1 | 9/2004 | Waites |
| 6,795,853 B1 | 9/2004 | Snover |
| 6,795,863 B1 | 9/2004 | Doty, Jr. |
| 6,799,039 B2 | 9/2004 | Wu et al. |
| 6,800,031 B2 | 10/2004 | Di Cesare |
| 6,807,574 B1 | 10/2004 | Partovi et al. |
| 6,834,276 B1 | 12/2004 | Jensen et al. |
| 6,839,737 B1 | 1/2005 | Friskel |
| 6,857,006 B1 | 2/2005 | Nishizawa |
| 6,862,710 B1 | 3/2005 | Marchisio |
| 6,879,665 B1 | 4/2005 | Cook et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appelman et al. |
| 6,917,965 B2 | 7/2005 | Gupta et al. |
| 6,920,478 B2 | 7/2005 | Mendiola et al. |
| 6,941,345 B1 | 9/2005 | Kapil et al. |
| 6,952,279 B1 | 10/2005 | Iida |
| 6,968,179 B1 | 11/2005 | De Vries |
| 6,975,719 B1 | 12/2005 | Gao et al. |
| 6,976,209 B1 | 12/2005 | Storisteanu et al. |
| 6,993,564 B2 | 1/2006 | Whitten, II |
| 6,996,520 B2 | 2/2006 | Levin |
| 7,003,719 B1 | 2/2006 | Rosenoff et al. |
| 7,035,865 B2 | 4/2006 | Doss et al. |
| 7,035,923 B1 | 4/2006 | Yoakum et al. |
| 7,039,676 B1 | 5/2006 | Day et al. |
| 7,043,530 B2 | 5/2006 | Isaacs et al. |
| 7,058,036 B1 | 6/2006 | Yu et al. |
| 7,058,690 B2 | 6/2006 | Maehiro |
| 7,065,186 B1 | 6/2006 | Myers et al. |
| 7,076,546 B1 | 7/2006 | Bates et al. |
| 7,082,047 B2 | 7/2006 | Chow |
| 7,082,407 B1 | 7/2006 | Bezos et al. |
| 7,100,116 B1 | 8/2006 | Shafrir et al. |
| 7,103,846 B1 | 9/2006 | Shafrir et al. |
| 7,107,526 B1 | 9/2006 | Weller |
| 7,110,510 B1 | 9/2006 | Shaffer et al. |
| 7,120,687 B1 | 10/2006 | Tessman, Jr. et al. |
| 7,120,871 B1 | 10/2006 | Harrington |
| 7,124,123 B1 | 10/2006 | Roskind et al. |
| 7,127,232 B2 | 10/2006 | O'Neil et al. |
| 7,143,356 B1 | 11/2006 | Shafrir et al. |
| 7,149,208 B2 | 12/2006 | Mattaway et al. |
| 7,165,213 B1 | 1/2007 | Busey et al. |
| 7,171,473 B1 | 1/2007 | Eftis et al. |
| 7,177,880 B2 | 2/2007 | Ruvolo |
| 7,185,059 B2 | 2/2007 | Daniell et al. |
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,233,992 B1 | 6/2007 | Muldoon et al. |
| 7,263,526 B1 | 8/2007 | Busey et al. |
| 7,275,206 B1 | 9/2007 | Bates et al. |
| 7,275,215 B2 | 9/2007 | Werndorfer et al. |
| 7,277,912 B2 | 10/2007 | Corboy et al. |
| 7,313,760 B2 | 12/2007 | Grossman et al. |
| 7,359,938 B1 | 4/2008 | Davies et al. |
| 7,366,764 B1 | 4/2008 | Vollebregt |
| 7,373,428 B1 | 5/2008 | Armstrong et al. |
| 7,436,780 B2 | 10/2008 | Stephens et al. |
| 7,437,413 B2 | 10/2008 | Okuyama et al. |
| 7,512,407 B2 | 3/2009 | Wu et al. |
| 7,512,652 B1 | 3/2009 | Appelman et al. |
| 7,525,951 B2 | 4/2009 | Musil et al. |
| 7,603,411 B1 | 10/2009 | Davies et al. |
| 7,620,722 B1 | 11/2009 | Ruparel |
| 7,686,693 B2 | 3/2010 | Danieli et al. |
| 7,765,484 B2 | 7/2010 | Roskind |
| 7,949,722 B1 | 5/2011 | Ullman et al. |
| 7,979,802 B1 | 7/2011 | Appelman |
| 8,001,190 B2 | 8/2011 | Bernstein |
| 8,122,363 B1 | 2/2012 | Appelman |
| 8,132,110 B1 | 3/2012 | Appelman et al. |
| 8,275,661 B1 | 9/2012 | Ponte et al. |
| 8,474,628 B1 | 7/2013 | Appelman |
| 8,959,164 B2 | 2/2015 | Appelman |
| 9,043,418 B2 | 5/2015 | Appelman |
| 9,100,221 B2 | 8/2015 | Appelman |
| 9,356,894 B2 | 5/2016 | Appelman |
| 9,360,996 B2 | 6/2016 | Appelman |
| 9,363,213 B2 | 6/2016 | Bernstein |
| 2001/0005861 A1 | 6/2001 | Mousseau et al. |
| 2001/0013050 A1 | 8/2001 | Shah |
| 2001/0044828 A1 | 11/2001 | Kikinis |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0056123 A1 | 5/2002 | Liwerant et al. |
| 2002/0065856 A1 | 5/2002 | Kisiel |
| 2002/0065894 A1 | 5/2002 | Dalal et al. |
| 2002/0069223 A1 | 6/2002 | Goodisman et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0103801 A1 | 8/2002 | Lyons |
| 2002/0112181 A1 | 8/2002 | Smith |
| 2002/0116336 A1 | 8/2002 | Diacakis et al. |

(56) References Cited

U.S. PATENT DOCUMENTS

| | | |
|---|---|---|
| 2002/0116463 A1 | 8/2002 | Hart |
| 2002/0116641 A1 | 8/2002 | Mastrianni |
| 2002/0130904 A1 | 9/2002 | Becker et al. |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0154210 A1 | 10/2002 | Ludwig et al. |
| 2002/0174010 A1 | 11/2002 | Rice, III |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0012348 A1 | 1/2003 | Skladman et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0069874 A1 | 4/2003 | Hertzog et al. |
| 2003/0079024 A1 | 4/2003 | Hough et al. |
| 2003/0084103 A1 | 5/2003 | Weiner et al. |
| 2003/0093580 A1 | 5/2003 | Thomas et al. |
| 2003/0097361 A1 | 5/2003 | Huang et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0165219 A1 | 9/2003 | Bedingfield et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0217073 A1 | 11/2003 | Walther et al. |
| 2003/0225834 A1 | 12/2003 | Lee et al. |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0017396 A1 | 1/2004 | Werndorfer et al. |
| 2004/0039779 A1 | 2/2004 | Amstrong et al. |
| 2004/0054729 A1 | 3/2004 | Fukuizumi et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0193722 A1 | 9/2004 | Donovan |
| 2004/0210844 A1 | 10/2004 | Pettinati et al. |
| 2004/0215648 A1 | 10/2004 | Marshall et al. |
| 2004/0215721 A1 | 10/2004 | Szeto et al. |
| 2004/0249899 A1 | 12/2004 | Shiigi |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0027716 A1 | 2/2005 | Apfel |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Daniell |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2005/0198173 A1 | 9/2005 | Evans |
| 2006/0075044 A1 | 4/2006 | Fox et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0277187 A1 | 12/2006 | Roese et al. |
| 2007/0156664 A1 | 7/2007 | Norton et al. |
| 2008/0082620 A1 | 4/2008 | Barsness |
| 2008/0222533 A1 | 9/2008 | Hankejh et al. |
| 2009/0089316 A1 | 4/2009 | Kogan et al. |
| 2010/0184517 A1 | 7/2010 | Danieli et al. |
| 2011/0231507 A1 | 9/2011 | Appelman |
| 2012/0030295 A1 | 2/2012 | Bernstein |
| 2013/0067339 A1 | 3/2013 | Appelman |
| 2013/0067340 A1 | 3/2013 | Appelman |
| 2013/0073645 A1 | 3/2013 | Appelman |
| 2013/0073648 A1 | 3/2013 | Appelman |
| 2013/0073651 A1 | 3/2013 | Appelman |
| 2013/0073652 A1 | 3/2013 | Appelman |
| 2013/0275526 A1 | 10/2013 | Appelman |
| 2013/0332957 A1 | 12/2013 | DeWeese et al. |
| 2015/0113440 A1 | 4/2015 | Appelman |
| 2015/0222575 A1 | 8/2015 | Appelman |
| 2015/0236992 A1 | 8/2015 | Appelman |
| 2016/0294740 A1 | 10/2016 | Bernstein |
| 2016/0380934 A1 | 12/2016 | Appelman |

FOREIGN PATENT DOCUMENTS

| | | |
|---|---|---|
| GB | 2319137 | 5/1998 |
| GB | 2357932 | 7/2001 |
| GB | 2368747 | 5/2002 |
| JP | 8-314826 | 11/1996 |
| JP | 2000-049901 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 5/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/09437 | 1/2002 |
| WO | WO 02/35781 | 5/2002 |
| WO | WO 02/062039 | 8/2002 |
| WO | WO 02/073886 | 9/2002 |
| WO | WO 04/028178 | 4/2004 |
| WO | WO 05/086723 | 9/2005 |

OTHER PUBLICATIONS

Haverstock, Paul, et al., "System and Method for Enabling a User to Obtain a User Status and Establish a Communication Link Using the User Status", U.S. Appl. No. 60/137,513, filed Jun. 2, 1999; 34 pages.

U.S. Appl. No. 13/616,734, Jul. 21, 2017, Office Action.

U.S. Appl. No. 14/702,516, Jun. 13, 2017, Office Action.

U.S. Appl. No. 13/616,630, Sep. 11, 2017, Office Action.

(56) References Cited

OTHER PUBLICATIONS

U.S. Appl. No. 14/702,516, Nov. 30, 2017, Office Action.
"Yahoo! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
"AOL Instant Messenger Windows Beta Features", Jun. 24, 1999, 2 pgs, AOL Instant Messenger All New Version 2.0,2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"What's new about exchanging information over the Internet," Outlook 2000 SR-1 (9.0.0.4527) Help File, on or before Aug. 10, 2001, p. 1.
"About Internet directory services," Outlook 2000 SR-1 (9.0.0.4527) Help File, on or before Aug. 10, 2001, p. 1.
"Set up LDAP directory services," Outlook 2000 SR-1 (9.0.0.4527) Help File, on or before Aug. 10, 2001, p. 1.
"Look up contact information from an item," Outlook 2000 SR-1 (9.0.0.4527) Help File, on or before Aug. 10, 2001, p. 1.
J.C. Cannon, "Design Guide for Directory-Enabled Applications," [online], Apr. 2001 [retrieved on May 13, 2003]. Retrieved from the Internet <http://msdn.microsoft.com/library/en-us/dnactdir/html/deal. asp?frame=true>, pp. 1-18.
Microsoft Corporation, "Using ADSI, LDAP, and Network Management Functions With Active Directory," [online], Feb. 2002 [retrieved on May 13, 2003]. Retrieved from the Internet <http:// msdn.microsoft.com/library/en-us/dnactdir/html/BuildingADApps. asp?frame=true>, pp. 1-9.
Microsoft Corporation, "Comparing Microsoft Active Directory to Novell's NDS," [online],Sep. 1998 [retrieved on May 13, 2003]. Retrieved from the Internet <http://msdn.rnicrosoft.comllibrary/en-us/dnactdir/html/msdnactivedirvsnds.as12?frame=true>, pp. 1-17.
Microsoft Corporation, "Active Directory Services Interface in the Microsoft Exchange 5.5 Environment," [online], Nov. 1997 [retrieved on May 13, 2003). Retrieved from the Internet <http://msdn.microsoft. com/library/en-us/dnactdir/html/msdn _adsiexch.asp?frame=true>, pp. 1-12.
"Active Directory Service Overview," [online], Nov. 30, 2001 [retrieved on May 13, 2003]. Retrieved from the Internet <http:// www.microsoft.com/windows2000/server/evaluation/business/ addatasheet.asp>, pp. 1-5.
"Integrating Microsoft Metadirectory Services and Active Directory," [online], Aug. 31, 2000 [retrieved on May 13, 20003]. Retrieved from the Internet <http://www.microsoft.comlwindows2000/ server/evaluation/news/bulletins/mmsma.asp>, p. 1.
"Benefits of Active Directory in a Windows 2000 Environment," [online], Sep. 20, 2001, [retrieved on May 13, 2003]. Retrieved from the Internet <http://www.microsoft.com/windows2000/server/ evaluation/business/adwin2k.asp>, pp. 1-9.
"Active Directory," [online], [retrieved on May 13, 2003]. Retrieved from the Internet <http://www.microsoft.com/windows2000/ technologies/directory/AD/default.asp>, pp. 1-13.
Microsoft Corporation, "Introduction to Active Directory Application Mode," Microsoft Windows Server 2003, Aug. 2002, pp. 1-13.
"Active Directory Features," [online], Jun. 15, 1999 [retrieved on May 13, 2003]. Retrieved from the Internet <http://www.microsoft. com/windows2000/server/evaluation/features/adlist.asp>, pp. 1-4.
"Windows 2000 Directory Services," [online], [retrieved on May 13, 2003]. Retrieved from the Internet <http://www.microsoft.com/ windows2000/technologies/directory/default.asp>, p. 1-2.
"Directory Integration Can Lower Total Cost of Ownership and Increase Application Functionality," [online], Jul. 27, 1998 [retrieved on May 13, 2003]. Retrieved from the Internet <http://www.microsoft. com/presspass/press/1998/Jul98/ActivDPR.asp>, pp. 1-4.
William R. Stanek, Microsoft Windows 2000 Administrator's Pocket Consultant [online]. Microsoft Corporation, 1999 [retrieved on May 8, 2003]. Retrieved from the Internet <http://www.microsoft.com/ technet/prodtechnol/ad/windows2000/evaluate/05w2kada. asp?fr . . . >, pp. 1-6.
"Enterprise Identity Management with Windows 2000 and Active Directory," [online], 1999 [retrieved on May 13, 2003]. Retrieved from the Internet <http://www.microsoft.com/technet/prodtechnol/ ad/windows2000/evaluate/w2keims.asp?fra . . . >, pp. 1-16.
"Integrating Applications with Windows 2000 and Active Directory," [online], Oct. 2000 [retrieved on May 8, 2003]. Retrieved from the Internet <http://www.microsoft.com/technet/prodtechnol/ ad/windows2000/evaluate/adappstr.asp?fra . . . >, pp. 1-12.
Eschenburg, Wo laufen sie denn?, Oct. 26, 1998, pp. 92-95.
Kohda et al., IMPP: A New Instant Messaging Standard and Its Impact on Internet Business, Dec. 2000, Fujitsu Sci. Tech. J., 36, 2 pp. 147-153.
International Search Report for International Application No. PCT/ US03/15715 dated Aug. 14, 2003.
"The LP Wireless Messenger", Messenger Documentation, [online]. LP Wireless, Inc., 2001 [retrieved on Nov. 2, 2002]. Retrieved from the Internet <http://www.lpwireless.com/messengerhelp.htm>, pp. 1-7.
European Search Report dated Aug. 30, 2005 for European Application No. 03731244.
McKendrick, Joseph; "Internet Call Centers: New Era in Customer Service"; Feb. 2002; V. 10, N. 2, pp. 22(4).
Ed Bott and Ron Person, Using Windows 95 with Internet Explorer 4.0, Feb. 17, 1998, Que, Special Edition.
America Online Inc., "New AIM 4.7," Sep. 27, 2001, Internet: http://aim.aol.com.
America Online Inc., "AOL Instant Messenger", Aug. 29, 2000, Internet: www.aol.com/aim/.
CNET Networks Inc., "PopUp Killer", Sep. 13, 2001, Internet: download.cnet.com/downloads/0-10059-100-6932612.html.
WebmasterWorld.com Inc., "HTML and Browsers", Mar. 5, 2001, Internet: www.webmaster.com/forum21/367.htm.
"AOL Instant Messenger All New Version 2.0", 2 pages, Jun. 24, 1999.
"Frequently Asked Questions About AOL Instant Messenger", 6 pages, Jun. 24, 1999.
"New Features in AOL Instant Messenger for Windows v. 2.01 Beta", 2 pages, Apr. 28, 1999.
"Quick Tips for Getting Started", 5 pages, Jun. 24, 1999.
"What is AOL Instant Messenger", 3 pages, Jun. 24, 1999.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"AOL Instant Messenger", reprinted from http://web.archive.org/ web/20010721193059/http://aim.com/ (Way Back Machine _ available on Jul. 21, 2001) on Aug. 26, 2005, 7 pages.
"BestCalls.com Announces the BestCalls Technology Index," Business Wire, Jun. 30,1999, Business Wire, p. 2.
"Better Bayesian Filtering," Paul Graham, Jan. 2003, pp. 1-11, http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery. com/idea/Degrees_20of_20Separation_20Emaii_20Protecti . . . printed on Mar. 1, 2004 (3 pages).
"Digital Artifacts for Remembering and Storytelling: Post History and Social Network Fragments," Viegas et al., retrieved from World Wide Web: http://we.media.mit.edu/~fviegas/papers/posthistory snf. pdf, 10 total pages (Jan. 2004).
"Finding Others Online: Reputation Systems for Social Online Spaces," Carlos Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive org/web/ 20010418153714//http://www.gordano.com , 2 pages.
"Hottie or Nottie? Web Site Voters Let You Know Whether You Sizzle or Fizzle," Marino, Jul. 11, 2001, Florida Times Union, 2 pages.

(56) References Cited

OTHER PUBLICATIONS

"Icq.anywhere, Email Features—Email Center—ICQ.com," retrieved Apr. 29, 2004 from the World Wide Web: http://www.icq.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnlx=0&adxnnlx=107029 . . . , printed on Nov. 5, 2004, 2 pages.
"Instant Messaging for Gamers," PC Gamer, May 2004, vol. 11, No. 5, (2 pages).
"Learning to Filter Spam E-Mail: A Comparison of a Naive Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anix.net/piespy printed on Mar. 11, 2004 (18 pages).
"plaxo," Plaxo, reprinted from http://web.archive.org/web/20041105072256/http://www.plaxo.com/ printed on Nov. 5, 2004 (available on Feb. 14, 2004) (2 pages).
"Plaxo—Update Your Address Book," Plaxo Contact Networks, reprinted from http://web.archive.org/web/20030218233638/http://www.plaxo.com/ printed on Nov. 5, 2004 (available on Feb. 18, 2003)(1 page).
"Reflections on Friendster, Trust and Intimacy," Danah Boyd. Ubicomp 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging:" retrieved Apr. 29, 2004 from the World Wide Web: http://www.rimrod.com/software/rim1/Webmessenger-Rim-J2ME-Instant-Messaging-20 . . . pp. 1-4.
"Six Degrees—New Programs Help Companies 'Mine Workers' Relationships for Key Business Prospects," William M. Bulkeley et al., Marketplace, The Wall Street Journal, Aug. 4, 2003. (3 pages).
"Social Nets Find Friends in VCs." Joanna Glasner. http://wwvv.wired.com/news , Nov. 17, 2003, pp. 1-3.
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10; Nov. 25, 2003, www.edventure.com. (36 pages).
"Social Social Networks: Deodorant for the Soul?," Esther Dyson, Esther Dyson's Monthly Report, vol. 21, No. 11, Dec. 12, 2003, www.edventure.com, (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004 (3 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.
"SWF Seeks Attractive Head Shot; To Stand Out, Online Daters Pay for Professional Photos; Cropping out the Ex-Wife," Leiber, Nov. 19, 2003, The Wall Street Journal, (1 page).
"Technical Solutions for Controlling Spam," Shane Hird, Proceedings of AUUG2002, Melbourne, Sep. 4-6, 2002, (17 pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Telstra targets Net spammers," J. Dudley, news.com.au, Dec. 2, 2003, (2 pages).
"The first Social Software . . . a true Social Adventure," Huminity—Social Networking, Chat Software, Create Personal Free Blogs and My Group . . . , reprinted from http://www.huminity.com/ printed on Nov. 5, 2004 (2 pages).
Trillian Discussion Forums—HOWTO: import ICQ 2003a Contact List: retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity. com/default. php?internationa . . . printed on Nov. 5, 2004 (available on Feb. 2103) (1 page).
"Will You Buy a Car From This Man?," Leander Kahney, Oct. 6, 2003. pp. 1-3.
Windows NetMeeting—Features, [Online], Jun. 17, 1999, XP002245623, Retrieved from the Internet: URL:http://www.microsoft.com/windows/NetMeeting/Features/default.ASP>, (8 pages).
Announce: Implementation of E-mail Spam Proposal, Maurice L. Marvin, news.admin.net-abuse.misc, Aug. 3, 1996,2 pages.
Anonymous: "Push to Talk™ Services", Internet Document, [Online], p. 1, Retrieved from the Internet: URL: http://www.nextel.com/services/directconnect/pttoverview.shtml [retrieved on Dec. 29, 2003].
Anonymous: "The Internet—the Advent of New Forms of Communication", Internet Document, [Online], pp. 1-4, Retrieved from the Internet: URL: http://journal.fujitsu.com/248e/e48now.html [retrieved on Dec. 29, 2003].
Archive.org archived "AOL Instant Messenger," [online] Jul. 21, 2001 [from file of U.S. Appl. No. 09/911,799] (7 pages).
Archive.org archived the Morpheus 1.9.1 download page on CNet Download.com [online] Oct. 8, 2001 [from file of U.S. Appl. No. 09/911,799] (2 pages).
Archive.org archived the MusicCity Morpheus download page on Cnet Download.com [online] Oct. 8, 2001 [from file of U.S. Appl. No. 09/911,799] (2 pages).
Australian Office Action dated Apr. 7, 2006, App. No. 2002340039 (2 pages).
BuddyGopher~About, available on Jul. 13, 2004, reprinted from http://web.archive.org/web/20040713002836/www.buddygopher.com/about.html on Sep. 28, 2005 (4 pgs).
BuddyGopher—We Love Away Messages!, "BuddyGopher simultaneously checks the away messages of your favorite AIM® buddies. ", available on Sep. 24, 2004, reprinted from http://web.archive.org/web/200409241 04001/http://www.buddygopher.com/ on Sep. 28, 2005 (2 pages).
Canadian Office Action from Application Serial No. 2,403,520, dated Feb. 21, 2005 (2 pages).
Chinese Office Action dated Jul. 7, 2006, App. No. 02821420X (5 pages).
International Search Report and Written Opinion dated Feb. 15, 2006 for International Application No. PCT/US05/07204, (10 pages).
European Search Report dated Aug. 30, 2005 for International Application No. EP03731244 (4 pages).
Office Action dated Feb. 29, 2006 for Japanese Patent Application No. 2002-515026 (6 pages).
Supplementary European Search Report issued in European Application No. EP05728303, dated Jan. 9, 2009, (2 pages).
CrushParty.com: Help, retrieved Jun. 12, 2002 from the World Wide Web: http://www.crushparty.com/help.jsp, (3 pages).
Dodgeball.com:: mobile social software, "help: text messaging", available on Oct. 13, 2004, reprinted from http://web.archive.org/web/20041013034241/www.dodgeball.com/social/helptext.php on Sep. 28, 2005 (3 pgs).
Dodgeball.com:: mobile social software, "help: the basics", available on Oct. 9, 2004, reprinted from http://web.archive.org/web/20041009200739/www.dodgeball.com/social/helpbasics.php on Sep. 28, 2005(2 pgs).

(56) References Cited

OTHER PUBLICATIONS

Dodgeball.com:: mobile social software, "help: use it", available on Oct. 9, 2004, reprinted from http://web.archive.ora/web/20041009201853/www.dodgeball.com/social/help useit.php on Sep. 28, 2005(2 pgs).
Dodgeball.com:: mobile social software, "Hook up with friends. Discover what's around you", available on Nov. 30, 2003, reprinted from http://web.archive.org/web/20041130034344/www.dodgeball.com/social/index.phpon Sep. 28, 2005 (2 pgs).
Dutta-Roy Amitava, "Virtual Meetings with Desktop Conferencing", IEEE Spectrum, vol. 35, No. 7, Jul. 1, 1998, pp. 47-56 and p. 66.
European Office Action in Application No. 01954931.0-2414, dated Jul. 14, 2008, 3 pages.
European Patent Office, Communication of Aug. 30, 2005, App. No. 03731244.4-2416 (PCT/US0315715) (4 pages).
European Patent Office, Communication of Aug. 31, 2009, App. No. 02778374.5-1238 (8 pages).
European Patent Office, Communication of Sep. 5, 2006, App. No. 02778374.5-1238 (3 pages).
Examiner's Answer dated Jan. 11, 2008 by USPTO in U.S. Appl. No. 09/810,159, 11 pages.
Home-tribe.net, http://washingtondc.tribe.net/message/24434d1b-817b-4580-aa42-3bffa15f26a?page=1, reprinted on Dec. 13, 2004), (2 pages).
http://www.friendster.com (reprinted on Dec. 13, 2004) (17 pages).
IBM "Configuring Sametime servers in your Domino environment" May 1, 2000 (14 pages).
International Search Report and Written Opinion for PCT Application No. PCT/US2005/042992, dated Mar. 6, 2007 (8 pages).
International Search Report dated Oct. 16, 2006, for PCT/US05/08476, (9 pages).
International Search Report, Application No. PCT/US05/45663, dated Apr. 11, 2008, (10 pages).
Opinion of International Search Authority, Application No. PCT/US05/45663, dated Apr. 11, 2008, (6 pages).
International Search Report, Application Serial No. PCT/US2006/018286, dated Oct. 19, 2006, (10 pages).
Isaacs, Ellen: "Example UI Spec: Sound Instant Messages", Internet Document, [Online], Retrieved from the Internet: URL: http://www.uidesigns.com/spec/d-sims.html [retrieved on Jun. 26, 2003] (2 pages).
Japanese Office Action dated May 12, 2008, App. No. 2003-533140 (5 pages).
Klaus Hartenstein et al., "xhtalk 2.9", © Nov. 1992, (6 pages).
Mariano, Gwendolyn. ZDNetNews. "Morpheus 1.9 to be unleashed", [online] Jun. 10, 2002 [from file of U.S. Appl. No. 09/911,799] (6 pages).
Mary Beth Marklein, "Student have 'away' with words", Mar. 28, 2004, USA Today, http://www.usatoday.com/tech/news/2004-03-28-aways-messages-usat_x.htm, 4 pages.
Matsumoto, Tatsuro et al.: "Chocoa Communicator—A New Communication System Based on Awareness and Text Communications—", Fujitsu Sci. Tech. J., 36, 2, pp. 154-161, Dec. 2000.
Mike Snider, "America goes online for New Year's bash", USA Today, Jan. 2, 2000 1 page.
Muller, Nathan, "Dial 1-800-Internet"; Feb. 1996, pp. 83-84, 86, 88.
Neo Mai, Ken Neo. "Buying and selling on the internet; [Computimes, 2* Edition]." New Straits Times. Kuala Lumpur: Jun. 28, 2001. 3 pages.
Office Action of Canadian Application No. 2,462,037, dated Feb. 12, 2009 (8 pages).
PCT International Search Report dated Apr. 11, 2003, App. No. PCT/US00/35160 (3 pages).
PCT International Search Report dated Jan. 9, 2003, App. No. PCT/US02/30730 (5 pages).
PowWow (Mar. 2, 2000), Introduction, Retrieved Apr. 3, 2006 from website: http://web.archive.org/web/20000301125635/ww2.tribal.com/help/online_docs/h205voic.html . (2 pages).
Pruitt, Scarlet. IDG News Service. "Morpheus Updates Peer-to-Peer Client" [online] Jun. 10, 2002 [accessed Feb. 14, 2007], Retrieved from Internet URL: http://www.pcworld.com/article/id_101736/article.html, (3 pages).
R. Movva & W. Lai, "MSN Messenger Service 1.0 Protocol", Aug. 1999. Internet Draft. http://tools.ietf:org/id/draft-movva-msn-messenger-protocol-oo.txt, (28 pages).
Reichard, K., "AOL, ICQ to Interoperate—But in a Limited Fashion," Oct. 30, 2002, Instant Messaging Planet, available at www.instantmessagingplanet.com/public/article.php/1490771, (4 pages).
Ryze home page, www.ryze.com, Dec. 21, 2003, available at http://web.archive.org/web/20031221010006/http://ryze.com, printed Mar. 16, 2005, (13 pages).
Takashi Yoshmoet al., "Namba: Location-Aware Collaboration System for Shopping and Meeting", Aug. 2002, IEEE Transactions on Consumer Electronics, pp. 470-447.
Tribal Voice, PowWow Guided Tour—Step 6, PowWow personal communication http://web.archive.org/web/20000817094516/www.tribal.com/powwow/tour/step6.cfm (Oct. 22, 1999), (2 pages).
VisiblePath webpages, www.visiblepath.org, Dec. 3, 2003, available at http://web.archive.org/web/20031203132211/http://www.visiblepath.com. printed Mar. 16, 2005, (5 pages).
Wayner, Peter, "Hey Baby, Call Me at My IP Address", Apr. 1996, pp. 142-144.
William R. Stanek, Microsoft Windows 2000 Administrator's Pocket Consultant [online]. Microsoft Corporation, 1999 [retrieved on May 8, 2003]. Retrieved from the Internet <http://www.microsoft.com/technet/prodtechnol/ad/windows2000/evaluate/05w2kadb.asp?fra . . . >, pp. 1-10.
Wingfield, N., "Technology Journal: Changing Chat—Instant Messaging Is Taking Off, and For some Users It's Nuzzling Out the Phone", Asian Wall Street Journal, New York, NY, Sep. 25, 2000, (5 pages).
Yubing Wang, Mark Claypool, Zheng Zuo. Video: An empirical study of realvideo performance across the internet. Proceedings of the 1st ACM SIGCOMM Workshop on Internet Measurement IMW'01. Nov. 2001. ACM Press. (15 pages).
ZeroDegrees home page, www.zerodegrees.com, Jan. 24, 2004, available at http://web.archive.org/web/20040204153037/www.zerodegrees.com/home.htm, printed Mar. 16, 2005, (2 pages).
Dictionary.com, http://dictionary.reference/browser/dialogue, Dec. 8, 2007, 1 page.
International Search Report issued in PCT/US01/20381, dated Dec. 4, 2002.
U.S. Appl. No. 09/810,159, Jul. 6, 2004, Office Action.
U.S. Appl. No. 09/810,159, Feb. 11, 2005, Office Action.
U.S. Appl. No. 09/810,159, Jun. 15, 2005, Office Action.
U.S. Appl. No. 09/810,159, Dec. 2, 2005, Office Action.
U.S. Appl. No. 09/810,159, Apr. 19, 2006, Office Action.
U.S. Appl. No. 09/810,159, Jan. 11, 2008, Office Action.
U.S. Appl. No. 09/810,159, Jan. 29, 2010, Office Action.
U.S. Appl. No. 09/843,788, Mar. 30, 2004, Office Action.
U.S. Appl. No. 09/843,788, Dec. 2, 2004, Office Action.
U.S. Appl. No. 09/843,788, Jul. 27, 2005, Office Action.
U.S. Appl. No. 09/843,788, Mar. 28, 2006, Office Action.
U.S. Appl. No. 09/843,788, Jun. 12, 2006, Advisory Action.
U.S. Appl. No. 09/843,788, Apr. 19, 2007, Office Action.
U.S. Appl. No. 09/843,788, Mar. 11, 2008, Notice of Allowance.
U.S. Appl. No. 09/843,788, Sep. 15, 2008, Office Action.
U.S. Appl. No. 09/843,788, May 5, 2010, Office Action.
U.S. Appl. No. 09/848,231, Mar. 30, 2004, Office Action.
U.S. Appl. No. 09/848,231, May 5, 2005, Office Action.
U.S. Appl. No. 09/848,231, Jun. 3, 2011, Office Action.
U.S. Appl. No. 09/848,231, Oct. 12, 2011, Office Action.
U.S. Appl. No. 09/848,232, Aug. 19, 2004, Notice of Allowance.
U.S. Appl. No. 09/848,232, Mar. 10, 2005, Notice of Allowance.
U.S. Appl. No. 09/911,799, Oct. 5, 2004, Office Action.
U.S. Appl. No. 09/911,799, Apr. 29, 2005, Office Action.
U.S. Appl. No. 09/911,799, Nov. 17, 2005, Office Action.
U.S. Appl. No. 09/911,799, Aug. 11, 2006, Office Action.
U.S. Appl. No. 09/911,799, Jul. 3, 2007, Office Action.
U.S. Appl. No. 09/911,799, Dec. 1, 2008, Office Action.
U.S. Appl. No. 09/911,799, Mar. 18, 2009, Office Action.

(56) References Cited

OTHER PUBLICATIONS

U.S. Appl. No. 09/911,799, Mar. 18, 2010, Office Action.
U.S. Appl. No. 10/134,437, Nov. 1, 2005, Office Action.
U.S. Appl. No. 10/134,437, May 18, 2006, Office Action.
U.S. Appl. No. 10/134,437, Aug. 21, 2006, Office Action.
U.S. Appl. No. 10/134,437, Sep. 6, 2007, Office Action.
U.S. Appl. No. 10/134,437, Feb. 11, 2008, Office Action.
U.S. Appl. No. 10/134,437, Sep. 18, 2008, Office Action.
U.S. Appl. No. 10/134,437, Mar. 10, 2009, Office Action.
U.S. Appl. No. 10/134,437, Oct. 2, 2009, Notice of Allowance.
U.S. Appl. No. 10/134,437, Nov. 17, 2009, Notice of Allowance.
U.S. Appl. No. 10/146,814, Sep. 20, 2005, Office Action.
U.S. Appl. No. 10/146,814, Jun. 22, 2006, Office Action.
U.S. Appl. No. 10/146,814, Dec. 11, 2006, Office Action.
U.S. Appl. No. 10/146,814, Jul. 2, 2007, Office Action.
U.S. Appl. No. 10/146,814, Apr. 15, 2008, Office Action.
U.S. Appl. No. 10/146,814, Mar. 22, 2010, Office Action.
U.S. Appl. No. 10/146,814, Oct. 1, 2010, Notice of Allowance.
U.S. Appl. No. 10/146,814, Jan. 20, 2011, Notice of Allowance.
U.S. Appl. No. 10/184,002, Aug. 25, 2005, Office Action.
U.S. Appl. No. 10/184,002, Apr. 20, 2006, Office Action.
U.S. Appl. No. 10/184,002, Jan. 9, 2007, Office Action.
U.S. Appl. No. 10/184,002, Jan. 8, 2008, Office Action.
U.S. Appl. No. 10/184,002, Jul. 24, 2008, Notice of Allowance.
U.S. Appl. No. 10/311,259, Jun. 26, 2006, Office Action.
U.S. Appl. No. 10/311,259, Jan. 25, 2007, Office Action.
U.S. Appl. No. 10/311,259, Apr. 16, 2007, Office Action.
U.S. Appl. No. 10/311,259, Dec. 12, 2007, Office Action.
U.S. Appl. No. 10/311,259, Mar. 19, 2008, Office Action.
U.S. Appl. No. 10/311,259, Oct. 16, 2008, Office Action.
U.S. Appl. No. 10/311,259, Apr. 27, 2009, Office Action.
U.S. Appl. No. 10/311,259, Nov. 25, 2009, Office Action.
U.S. Appl. No. 10/311,259, Mar. 18, 2010, Office Action.
U.S. Appl. No. 10/311,259, Sep. 7, 2010, Office Action.
U.S. Appl. No. 10/311,259, Dec. 22, 2010, Office Action.
U.S. Appl. No. 10/311,259, Apr. 5, 2011, Notice of Allowance.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/633,636, Oct. 11, 2006, Office Action.
U.S. Appl. No. 10/633,636, Jun. 20, 2007, Office Action.
U.S. Appl. No. 10/633,636, May 25, 2010, Office Action.
U.S. Appl. No. 10/633,636, Nov. 9, 2010, Office Action.
U.S. Appl. No. 10/633,636, Oct. 27, 2011, Notice of Allowance.
U.S. Appl. No. 10/747,623, Mar. 13, 2007, Office Action.
U.S. Appl. No. 10/747,623, Aug. 21, 2007, Office Action.
U.S. Appl. No. 10/747,623, Nov. 14, 2007, Office Action.
U.S. Appl. No. 10/747,623, Jun. 23, 2008, Office Action.
U.S. Appl. No. 10/747,624, Feb. 26, 2007, Office Action.
U.S. Appl. No. 10/747,624, Jul. 16, 2007, Office Action.
U.S. Appl. No. 10/747,624, Nov. 1, 2007, Office Action.
U.S. Appl. No. 10/747,679, Oct. 2, 2007, Office Action.
U.S. Appl. No. 10/747,679, Apr. 29, 2008, Office Action.
U.S. Appl. No. 10/981,460, Aug. 20, 2008, Office Action.
U.S. Appl. No. 11/015,424, Mar. 19, 2008, Office Action.
U.S. Appl. No. 11/015,424, Nov. 3, 2008, Office Action.
U.S. Appl. No. 11/015,424, May 1, 2009, Office Action.
U.S. Appl. No. 11/015,424, Oct. 19, 2009, Office Action.
U.S. Appl. No. 11/017,204, Dec. 12, 2007, Office Action.
U.S. Appl. No. 11/017,204, Jun. 23, 2008, Office Action.
U.S. Appl. No. 11/150,180, Oct. 2, 2007, Office Action.
U.S. Appl. No. 11/150,180, Apr. 7, 2008, Office Action.
U.S. Appl. No. 11/150,180, Nov. 5, 2008, Office Action.
U.S. Appl. No. 11/150,180, Aug. 19, 2009, Office Action.
U.S. Appl. No. 11/150,180, Sep. 27, 2011, Notice of Allowance.
U.S. Appl. No. 11/150,180, Sep. 11, 2012, Notice of Allowance.
U.S. Appl. No. 11/150,180, Mar. 28, 2013, Notice of Allowance.
U.S. Appl. No. 11/150,180, Jun. 6, 2013, Notice of Allowance.
U.S. Appl. No. 11/237,718, Apr. 2, 2009, Office Action.
U.S. Appl. No. 11/237,718, Oct. 30, 2009, Office Action.
U.S. Appl. No. 11/238,110, Nov. 29, 2007, Office Action.
U.S. Appl. No. 11/238,110, Jul. 9, 2008, Office Action.
U.S. Appl. No. 11/238,110, Oct. 9, 2008, Office Action.
U.S. Appl. No. 11/238,129, Nov. 14, 2007, Office Action.
U.S. Appl. No. 11/238,129, May 28, 2008, Office Action.
U.S. Appl. No. 11/238,130, Jul. 3, 2008, Office Action.
U.S. Appl. No. 11/238,130, Nov. 13, 2008, Office Action.
U.S. Appl. No. 11/238,130, Apr. 14, 2009, Office Action.
U.S. Appl. No. 11/238,130, Nov. 24, 2009, Office Action.
U.S. Appl. No. 12/336,880, Aug. 4, 2010, Office Action.
U.S. Appl. No. 13/149,368, Jul. 7, 2014, Office Action.
U.S. Appl. No. 13/149,368, Oct. 24, 2014, Office Action.
U.S. Appl. No. 13/149,368, Mar. 16, 2015, Office Action.
U.S. Appl. No. 13/149,368, Jul. 30, 2015, Office Action.
U.S. Appl. No. 13/175,410, Dec. 20, 2011, Office Action.
U.S. Appl. No. 13/175,410, Apr. 3, 2012, Office Action.
U.S. Appl. No. 13/175,410, Aug. 10, 2012, Office Action.
U.S. Appl. No. 13/175,410, Apr. 1, 2013, Office Action.
U.S. Appl. No. 13/175,410, Jul. 1, 2013, Office Action.
U.S. Appl. No. 13/175,410, Oct. 10, 2013, Office Action.
U.S. Appl. No. 13/396,132, Sep. 11, 2014, Office Action.
U.S. Appl. No. 13/396,132, Feb. 23, 2015, Office Action.
U.S. Appl. No. 13/396,132, Jul. 29, 2015, Office Action.
U.S. Appl. No. 13/396,132, Mar. 15, 2016, Notice of Allowance.
U.S. Appl. No. 13/397,568, May 9, 2013, Office Action.
U.S. Appl. No. 13/397,568, Dec. 5, 2013, Office Action.
U.S. Appl. No. 13/397,568, Jun. 6, 2014, Office Action.
U.S. Appl. No. 13/397,568, Oct. 6, 2014, Notice of Allowance.
U.S. Appl. No. 13/616,630, May 21, 2015, Office Action.
U.S. Appl. No. 13/616,630, Dec. 31, 2015, Office Action.
U.S. Appl. No. 13/616,707, Nov. 20, 2014, Office Action.
U.S. Appl. No. 13/616,707, Feb. 12, 2015, Office Action.
U.S. Appl. No. 13/616,707, Jul. 15, 2015, Office Action.
U.S. Appl. No. 13/616,707, Dec. 16, 2015, Office Action.
U.S. Appl. No. 13/616,707, Jun. 15, 2016, Office Action.
U.S. Appl. No. 13/616,734, Oct. 24, 2014, Office Action.
U.S. Appl. No. 13/616,734, Feb. 12, 2015, Office Action.
U.S. Appl. No. 13/616,734, Jul. 29, 2015, Office Action.
U.S. Appl. No. 13/616,734, Feb. 2, 2016, Office Action.
U.S. Appl. No. 13/617,413, Oct. 24, 2014, Office Action.
U.S. Appl. No. 13/617,413, Feb. 12, 2015, Office Action.
U.S. Appl. No. 13/617,413, Aug. 13, 2015, Office Action.
U.S. Appl. No. 13/617,413, Jan. 29, 2016, Notice of Allowance.
U.S. Appl. No. 13/616,666, Apr. 1, 2013, Office Action.
U.S. Appl. No. 13/616,666, Feb. 14, 2014, Office Action.
U.S. Appl. No. 13/616,666, Aug. 13, 2014, Office Action.
U.S. Appl. No. 13/616,666, Jan. 12, 2015, Notice of Allowance.
U.S. Appl. No. 13/616,666, Feb. 23, 2015, Notice of Allowance.
U.S. Appl. No. 13/616,666, Jun. 18, 2015, Notice of Allowance.
U.S. Appl. No. 13/616,678, Mar. 27, 2013, Office Action.
U.S. Appl. No. 13/616,678, Oct. 4, 2013, Office Action.
U.S. Appl. No. 13/616,678, Dec. 4, 2013, Advisory Action.
U.S. Appl. No. 13/616,678, Dec. 24, 2013, Office Action.
U.S. Appl. No. 13/616,678, Sep. 2, 2014, Office Action.
U.S. Appl. No. 13/616,678, Dec. 12, 2014, Notice of Allowance.
U.S. Appl. No. 13/616,678, Feb. 12, 2015, Notice of Allowance.
U.S. Appl. No. 13/616,692, Mar. 27, 2013, Office Action.
U.S. Appl. No. 13/617,374, May 21, 2015, Office Action.
U.S. Appl. No. 13/617,374, Jan. 5, 2016, Office Action.
U.S. Appl. No. 13/620,985, Jun. 17, 2013, Office Action.
U.S. Appl. No. 13/620,985, Nov. 8, 2013, Office Action.
U.S. Appl. No. 13/620,985, Mar. 12, 2014, Office Action.
U.S. Appl. No. 13/620,985, Sep. 19, 2014, Office Action.
U.S. Appl. No. 13/620,985, Jun. 30, 2015, Office Action.
U.S. Appl. No. 13/620,985, Mar. 2, 2016, Notice of Allowance.
U.S. Appl. No. 13/617,402, Jul. 28, 2015, Office Action.
U.S. Appl. No. 13/617,402, Jan. 13, 2016, Office Action.
U.S. Appl. No. 13/784,647, Jul. 23, 2015, Office Action.
U.S. Appl. No. 13/784,647, Feb. 26, 2016, Office Action.

(56) References Cited

OTHER PUBLICATIONS

U.S. Appl. No. 14/586,793, Jun. 19, 2015, Office Action.
U.S. Appl. No. 14/586,793, Sep. 14, 2015, Office Action.
U.S. Appl. No. 14/586,793, Jun. 22, 2016, Notice of Allowance.
U.S. Appl. No. 14/690,201, Jul. 30, 2015, Office Action.
U.S. Appl. No. 13/175,410, Oct. 18, 2016, Notice of Allowance.
U.S. Appl. No. 13/616,630, Oct. 31, 2016, Office Action.
U.S. Appl. No. 13/616,707, Oct. 6, 2016, Office Action.
U.S. Appl. No. 14/702,516, Dec. 30, 2016, Office Action.
U.S. Appl. No. 13/616,707, Apr. 11, 2017, Office Action.
U.S. Appl. No. 13/616,630, Jul. 14, 2016, Office Action.
U.S. Appl. No. 13/617,374, Aug. 23, 2016, Office Action.
U.S. Appl. No. 13/617,402, Aug. 18, 2016, Notice of Allowance.
U.S. Appl. No. 13/784,647, Sep. 20, 2016, Office Action.
U.S. Appl. No. 14.690,201, Jul. 5, 2016, Office Action.
"AOL technology: turning complicated things into engaging services", 1996 Annual Report, 22 pages.
"Integrating Microsoft Metadirectory Services and Active Directory," [online], Aug. 31, 2000 [retrieved on May 13, 2003]. Retrieved from the Internet <http://www.microsoft.comlwindows2000/server/evaluation/news/bulletins/mmsma.asp>, p. 1.
"Directory Integration Can Lower Total Cost of Ownership and Increase Application Functionality," [online], Jul. 27, 1998 [retrieved on May 13, 2003]. Retrieved from the Internet <http://www.microsoft.com/presspass/press/1998/Jul98/ActivDPR.asp>, pp. 1-4.
"RIM Road: Software: Internet & Network: Webmessenger RIM J2ME/Instant Messaging:" retrieved Apr. 29, 2004 from the World Wide Web: http://www.rimrod.com/software/riml/Webmessenger-RIM-J2ME-lnstant-Messaging-20 . . . pp. 1-4.
"Text Categorization with Support Vector Machines: Learning with Many Relevant Features," Thorsten Joachims, University of Dortmund, Computer Science Dept., LS-8 Report 23, 1998, (18 pages).
"Welcome to Huminity World of Connections," Huminity-Home, reprinted from http://web.archive.org/web/20030228131435/www.huminity.com/default. php?internationa . . . printed on Nov. 5, 20014 (available on Feb. 2103) (1 page).
European Patent Office, Communication dated Aug. 30, 2005, App. No. 03731244.4-2416 (PCT/US0315715) (4 pages).
PowWow (Mar. 1, 2000), Introduction, Retrieved Apr. 3, 2006 from website: http://web.archive.org/web/20000301125635/ww2.tribal.com/help/online_docs/h205voic.html. (2 pages).
U.S. Appl. No. 09/848,231, Oct. 12, 2011, Notice of Allowance.
U.S. Appl. No. 10/146,814, May 22, 2006, Office Action.
"AOL technology: turning complicated things into engaging services", 1996 Annual Report, 22 pages, Dec. 1996.
"Introducing the Gordano Messaging Suite"; http://www.gordano.com; Copyright 1994-2003 Gordano, Oct. 2005.
"Using Active Directory Service", from Chapter 5, Microsoft Windows 2000 Administrator's Pocket Consultant, by William R. Stanek (1999). Retrieved from http://www.microsoft.com/technet/12rodtechnol/ad/windows2000/evaluate/05w2kadb.asp?fr . . ., pp. 1-6, Feb. 2000.
"Working with Active Directory Domains", from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr . . ., pp. 1-10, Feb. 2000.
"A Countermeasure to Duplicate-detecting Anti-spam Techniques," Robert J. Hall, AT&T Labs Technical Report 99.9.1, Dec. 1999, Abst. and pp. 1-26.
"Learning Spam: Simple Techniques for Freely-Available Software," Bart Massey et al., Computer Science Dept., Portland, OR USA, Jun. 2003, pp. 1-14.
"SVM-based Filtering of E-mail Spam with Content-specific Misclassification Costs," Aleksander Kolcz et al., TextDM'2001 (IEEE ICDM-2001 Workshop on Text Mining), San Jose. CA, Jan. 2001, pp. 1-14.
"Text Categorization with Support Vector Machines: Learning with Many Relevant Features," Thorsten Joachims, University of Dortmund, Computer Science Dept., LS-8 Report 23, Apr. 1998, (18 pages).
Anand Ranganalhan et al., "ConChat: A Context-Aware Chat Program", Jul.-Sep. 2002, Pervasive Computing, pp. 51-57.
Courter et al., "Mastering Microsoft Outlook 2000 Premium Edition", Sybex Inc., Alameda, California, May 2000, pp. 167-169, ISBN 0-7821-2676-6.
Satter, Michael, excerpts from Internet TV with CU-SeeMe, First Edition, including inside Title page and Copyright page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, What the Future Holds, pp. 227-233; Appendix A, "Troubleshooting O&A," pp. 235-249; published by Sams.net Publishing, 201 W. 103rd St., Indianapolis, IN 46290, International Standard Book No. 1-57521-006-1, Library of Congress Catalog Card No. 95-70178, copyright© 1995, Sep. 1995.
WBWE (199B), PowWow 3.6 Brings the Power of Internet Community to the People, Business Wire, (2 pages), Jun. 1998.
"Using Active Directory Service", from Chapter 5, Microsoft Windows 2000 Administrator's Pocket Consultant, by William R. Stanek (1999). Retrieved from http://www.microsoft.com/technet/12rodtechnol/ad/windows2000/evaluate/05w2kadb.asp?fr . . ., pp. 1-6, Feb. 2000.
U.S. Appl. No. 14/702,516, Jun. 27, 2018, Notice of Allowance.
U.S. Appl. No. 15/237,883, Jul. 26, 2018, Notice of Allowance.

E-MAIL INTEGRATED INSTANT MESSAGING

CROSS-REFERENCE TO RELATED APPLICATIONS

The present application is a continuation of U.S. application Ser. No. 15/143,111 filed Apr. 29, 2016, which is a continuation of U.S. application Ser. No. 13/620,985 filed Sep. 15, 2012, which is now issued as U.S. Pat. No. 9,363,213, which is a continuation of U.S. application Ser. No. 13/175,410 filed Jul. 1, 2011, which is a continuation of U.S. application Ser. No. 10/311,259 filed Dec. 11, 2002, which is now issued as U.S. Pat. No. 8,001,190, which is a 371 national stage application of international application number PCT/US01/20381 filed Jun. 25, 2001, which claims the benefit of and priority to U.S. provisional application No. 60/214,157 filed Jun. 26, 2000. Each of the aforementioned patent(s) and application(s) are hereby incorporated by reference in their entirety.

TECHNICAL FIELD

This invention relates to initiation of an Instant Messaging (IM) session between two or more parties and communication using a "standard/standalone" Instant Messaging paradigm with or without email integration.

BACKGROUND ART here are at least four major problems that are common in today's Instant Messaging (IM) systems including: "screen name" namespace problems, privacy problems, lack of acceptable and automated Instant Messaging message archiving, and service provider compatibility/software deliverability problems.

The namespace problem can be broken down into three sub-problems, as follows:

"Screen names" are not unique across IM providers. In today's Instant Messaging software, each Instant Messaging service provider maintains a separate and proprietary "screen name" namespace. This leads to users of one Instant Messaging service not being able to freely communicate with the users of a different Instant Messaging service provider because names in each namespace are not universal, so, for example, the user "Johril" in AOL's Instant Messenger (AIM) might refer to John Smith, while "John P in Yahoo's Messenger might refer to John Jones.

Obtaining a desired name is difficult, and will only get more difficult. The namespaces available within each Instant Messaging provider are extremely crowded. For example, when signing up with the largest of the Instant Messaging providers, AOL's Instant Messenger (AIM) service, a typical user would rarely succeed with their first choice for a screen name because there are over 90 million names already in use. In the case of AOL, this problem will only get worse as over 3 million new users sign up for AIM each month.

"Screen names" frequently have little or no connection to a person's "real" name. Most Instant Messaging screen names are names like "doglover3", "corvette33", etc., since, as described above, names like "John Smith" have all been taken. Therefore users end up with screen names which are hard for others to remember. This problem is of particular concern in the business world where universal and recognizable user names are essential for conducting business.

The privacy problem can be seen as follows. In the Instant Messaging environments available by current Instant Messaging providers a particular user's presence online can easily, or even automatically, be detected by others. When a user begins an Instant Messaging session using one of these Instant Messaging providers, all other users who are interested in this user are notified that the he just went "online". Some Instant Messaging providers do provide some protection against this "presence detection". They may allow users to set an option to either let "no one" know that they are online, or to block certain people from knowing they are online. Unfortunately, these type of features are cumbersome to use since they are not automatic and force users to constantly manage who can "see" them and who cant.

The Instant Messaging archiving problem can be seen as follows. Some currently available Instant Messaging client software allows users to save transcripts of an Instant Messaging session as a file on their computer disk. But the client software does not allow them to file these sessions away, title them, etc., as they would with email, and the feature is cumbersome enough that most users either don't know it exists, or simply don't use it. This gives Instant Messaging a disadvantage when compared to email because it does not allow the user to maintain an automatic archive of what was discussed in the Instant Messaging session.

There are several problems associated with Instant Messaging service provider compatibility and software delivery. Today, Instant Messaging service providers require users download a particular piece of software to execute on their computer. This type of Instant Messaging software causes at least three major problems.

Lack of interoperability causes a significant problem. Each Instant Messaging service provider only supports its own Instant Messaging protocol and client software. Clients from one Instant Messaging service provider, using that service provider's Instant Messaging software can typically only communicate with other people who use the same service provider and software. A person cannot arbitrarily send an Instant Message to another person, unless that other person uses the same Instant Messaging service provider and software that they do. For example, "Joe" uses AOL's Instant Messenger, and "Jane" uses Yahoo's Messenger. Even if Joe and Jane know each other's screen names, they cannot communicate with each other since they are using different Instant Messaging service providers.

Lack of platform independence is another problem. Today's Instant Messaging service providers and software typically will only execute on a limited number of hardware platforms, so users on non-supported platforms will not be able to communicate with users on supported platforms.

The inability to work through network "firewalls" causes additional problems. The current Instant Messaging service providers and software offerings will typically not work through "firewalls". Since most business enterprises have firewalls in place, these programs preclude users inside the organization from communicating with users outside of the organization. Additionally, as home networks become more prevalent, the use of firewalls will become more common and the significance of this problem will increase.

SUMMARY OF THE INVENTION

Certain embodiments of the present invention are directed to a system supporting the initiation of an Instant Messaging (IM) session between two or more parties through the use of email programs and standard web browsers. Additionally, it allows users to communicate using a "standard/standalone"

Instant Messaging paradigm (i.e. without email integration) which affords users the features of today's popular Instant Messaging services, but also provides at least the additional benefits listed in the summary.

Regarding the namespace problem, users are not required to use proprietary "screen names". Instead, the inventive system allows the parties to use their email address as their "screen name". Email addresses have the advantages that they are much more pervasive and established than typical Instant Messaging "screen names", and valid email addresses are guaranteed to be universally unique names.

The present invention details a process whereby a computer user may send an "IM Enhanced" or "Live" email to another person, using a standard email program, by knowing only the recipient's email address.

Regarding the privacy problem, when an Instant Messaging session is initiated via email, strict privacy rules are enforced in a non-intrusive manner; one user cannot "blindly" initiate a messaging session with another user, unless the second user accepts the Instant Messaging invitation. Furthermore, the initial chat request is not delivered via an Instant Message, rather, it is delivered in an email. Upon receipt of the email invitation, the recipient initiates an Instant Messaging conversation with the sender (who's acceptance is implicit since the sender initiated the Instant Messaging request). When an Instant Messaging session is initiated via the "standalone" Instant Messaging web page, the user is able to control presence detection in the same sorts of ways as most commonly available Instant Messaging software allows.

The present invention also details the process whereby users may indicate that presence detection is allowed only to certain individuals simply by sending those individuals an email/IM invitation. This email becomes the implicit "permission" for the recipient to converse with the sender, so no other action is required on the part of the sender. This provides a very dynamic and powerful means of granting "permission" to message, and the permissions may even be email message specific. This means that if Joe sends Jane an IM-enhanced email, Jane would be able to communicate to Joe through that email, but if Jane used the standalone Instant Messaging service, she may not by able detect Joe's presence, assuming Joe has "total privacy" selected.

The sender is not able to initiate the Instant Messaging conversation in any way other than through an email. This prevents users from getting Instant Messaging "spam". If the recipient accepts the Instant Messaging invitation included in the email, they can begin a conversation with the sender (who is assumed to have implicitly accepted IMs from the recipient). Since these Instant Messaging conversations are initiated via email, the spam problem is also addressed by leveraging all of the protections already in place for protecting users against email spam, this includes existing legislation, filtering software, etc.

Regarding the problem of Instant Messaging message archiving, users may choose to permanently save Instant Messaging sessions in much the same way that they save email. The Instant Messaging session might even be saved as part of the email. This allows instant Messaging archives to be referred back to in the future. Additionally, if there was an Instant Messaging session as a result of an email, that Instant Messaging session will be automatically saved in conjunction with the email, so that anytime in the future the user chooses to read that particular piece of email, they will also see the associated messaging.

Upon receiving such an email, the recipient will be able to read the email "body" as they always have, and below the email body will be an area in which to participate in an Instant Messaging conversation with the sender.

As the Instant Messaging session proceeds, it is constantly being saved on the server computer, which provides the Instant Messaging support. This allows users to file away emails as always, and at any future time, when they view the email, the full transcript of the Instant Messaging session will also appear. This allows users to both maintain conversations about the email together with the email, as well as to maintain an automatic archive of their Instant Messaging session (users would, of course, be able to disable this feature).

Regarding Instant Messaging service provider compatibility and software delivery problems, no explicit signup or software is needed. Sender and recipient need not be signed up with a common Instant Messaging service provider, or any service provider at all in order to message each other. Users may "message" each other without the need for explicit client software downloads. Messaging is performed with standard DHTML within an email window [though the Instant Messaging part of this invention can also be utilized in an "IM only" mode, without the use of email].

This "IM area" is rendered within the email message, using only generally available browser technologies, such as DHTML. No other software is required for the user to download, and no "plugins" are required. This allows any user with a popular browser to immediately, and seamlessly, participate in an Instant Messaging session.

The whole Instant Messaging session takes place using only the publicly-defined Internet protocol known as HTTP allowing Instant Messaging conversations to take place across firewalls. The present invention also details the process whereby a computer user may send or receive "standard" Instant Messages, from a web-based Instant Messaging web page/application. The implementation of this "standalone" web page uses the same software "engine" as the software described above, which allows users to Instant Messaging each other within their emails. Though there are many benefits to the email/Im solution, a standalone solution is required as well, since the sender needs a way to communicate with the recipient once the recipient chooses to initiate an Instant Messaging session. Additionally, users often choose to communicate only via Instant Messages, and not use email. It is in the standalone incantation of this software where the privacy and presence-hiding and http presence-detection features of this software shine.

These and other advantages of the present invention will become apparent upon reading the following detailed descriptions and studying the various figures of the drawings.

DETAILED DESCRIPTION OF THE INVENTION

Figure 1:
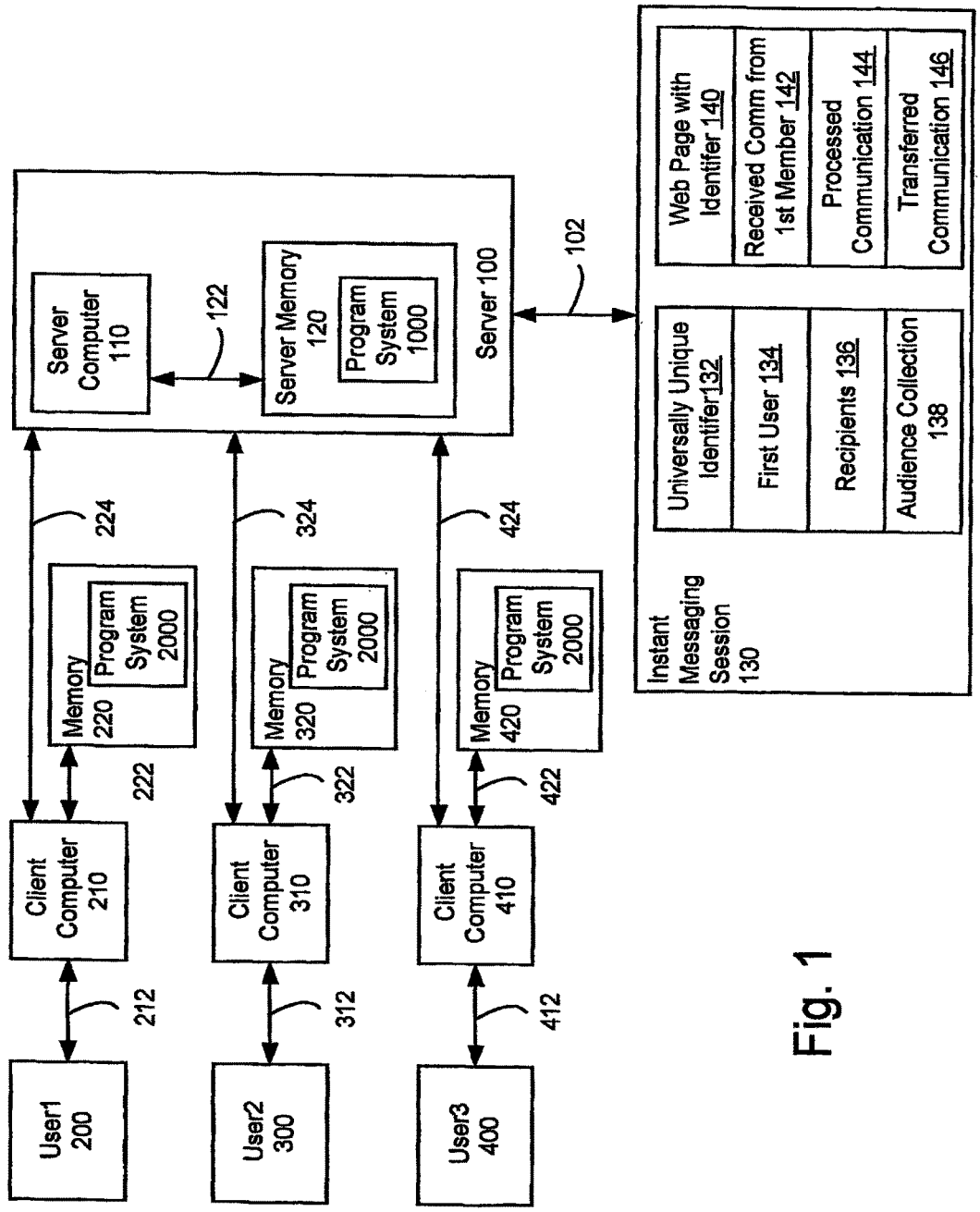
FIG. 1 depicts a system comprising a server 100 communicatively coupled to associated client computers used by users supporting email communications and web browser compliant communications to provide instant messaging between at least two of the users.

FIG. 1 depicts a system comprising a server 100 communicatively coupled to associated client computers used by users supporting email communications and web browser compliant communications to provide instant messaging between at least two of the users.

The server computer 110 delivers formatted web pages to the client computer providing an area for the user of the client computer to participate in an Instant Messaging session. Each Instant Messaging session has a universally unique identifier, which the server computer uses to identify and store individual Instant Messages.

Server 100 communicatively couples 224 to client computer 210 used by user 200 supporting email communications and web browser compliant communications. Similarly, server 100 communicatively couples 324 and 424 to client computers 310 and 410 user by users 300 and 400, respectively.

Server 100 includes server computer 110 accessibly coupled 122 to server memory 120. Server program system 1000 operates server 100 and is comprised of program steps residing in server memory 120.

Each client computer 210, 310, and 410, is accessibly coupled 222, 322 and 422 to a respective memory 220, 320, and 420. In certain embodiments of the invention, program system 2000 operates the associated client computer based upon the interaction of the user and communications with server 100.

Each user may employ at least one of acoustic and tactile input to the associated client computer in its use. The usage may vary. By way of example, user 200 may use 212 tactile input such as a keyboard and pointing device. User 300 may use 312 acoustic input exclusively. User 400 may user 412 a combination of acoustic and tactile input.

User presentation of instant messaging communication as well as alerts regarding instant messaging invitations may be presented in at least one of the following ways: visually, acoustically, and tactilely.

By way of example, the visual alert may include an icon presented on a view screen, or by turning on a light. The acoustic alert may emit at least one of the following: an alert sound or an alert audio message. A tactile alert may include raising or lowering a tactile output member, such as found on a Braille keyboard. Any of these alerts may include a representation of the first user, the time of receipt of the invitation, as well as other information which may be part of the invitation, such as the intended topic or agenda of the instant messaging session.

By way of example, the areas of a web page may be associated with distinct voices by which contented presented in an area may be acoustically presented to the user. The acoustic presentation may follow the order of receipt of the transferred communication, or the user may specify that a priority scheme by which various transferring communications received within a period of time are ordered for presentation. The user may further specify that differing voices may be presented louder or softer. The user may silence a voice.

Note that the server 100 communicatively coupled to the associated client computer used by the user may further support a version of TCP-IP compliant protocols in communication with the user, for at least one of the users.

Server 100 communicatively coupled to the associated client computer used by the user may further support at least one of the following:
- a version of Wireless Application Protocol (WAP) compliant protocols in communication with the user;
- a version of Bluetooth compliant protocols in communication with the user;
- a version of HTTP compliant protocols in communication with the user; and
- a version of XML compliant protocols in communication with the user.

Instant messaging session 130 involves a universally unique identifier 132 and web page 140 based upon that universally unique identifier, initiated by a first user 134 involving at least one recipient 136 contacted by email through their email address. Each recipient 136 is sent an instant messaging invitation email message.

The first user 134 is a member of the audience collection 138. When and if a recipient 136 responds to the instant messaging invitation email message, it becomes a member of the audience collection 138.

When a communication 142 is received from a first member of the audience collection 138, a transferred communication 144 from the first member is sent to all audience collection members.

Upon receipt of communication 142, it may be processed to create the processed communication 142 from the first member, which is then sent to all audience collection members as the transferred communication 144.

Figure 2A:
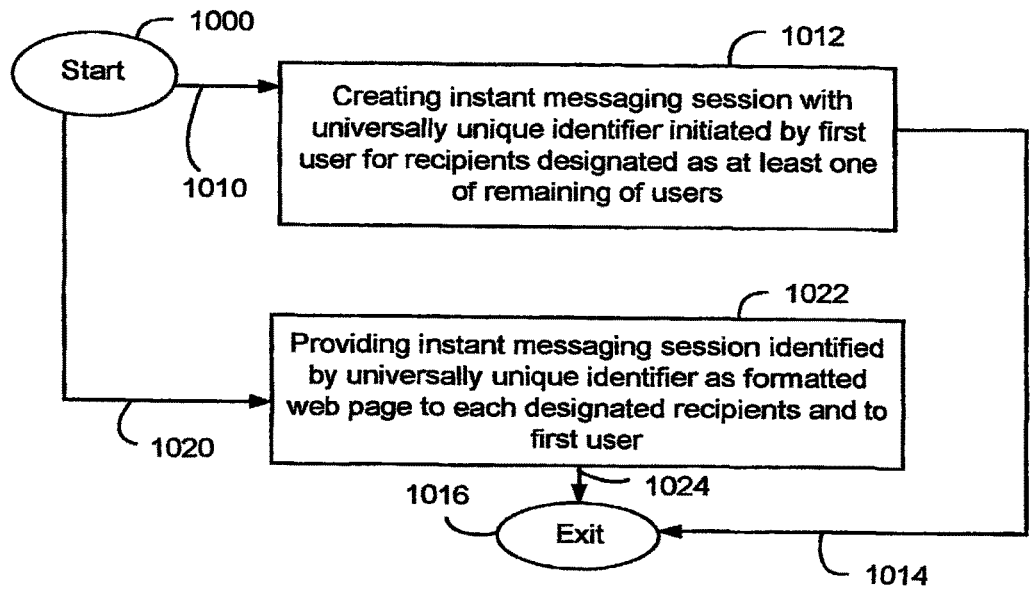
FIG. 2A depicts a detail flowchart of server program system 1000 of FIG. 1 for supporting instant messaging between at least two of the users.

FIG. 2A depicts a detail flowchart of server program system 1000 of FIG. 1 for supporting instant messaging between at least two of the users.

Arrow 1010 directs the flow of execution from starting operation 1000 to operation 1012. Operation 1012 performs creating an instant messaging session with a universally unique identifier initiated by a first of the users for recipients designated as at least one of the remaining of the users. Arrow 1014 directs execution from operation 1012 to operation 1016. Operation 1016 terminates the operations of this flowchart.

Arrow 101010 directs the flow of execution from starting operation 1000 to operation 101012. Operation 10102 performs providing the instant messaging session identified by the universally unique identifier as a formatted web page to each of the designated recipients and to the first user. Arrow 101014 directs execution from operation 101012 to operation 1016. Operation 1016 terminates the operations of this flowchart.

Figure 2B:
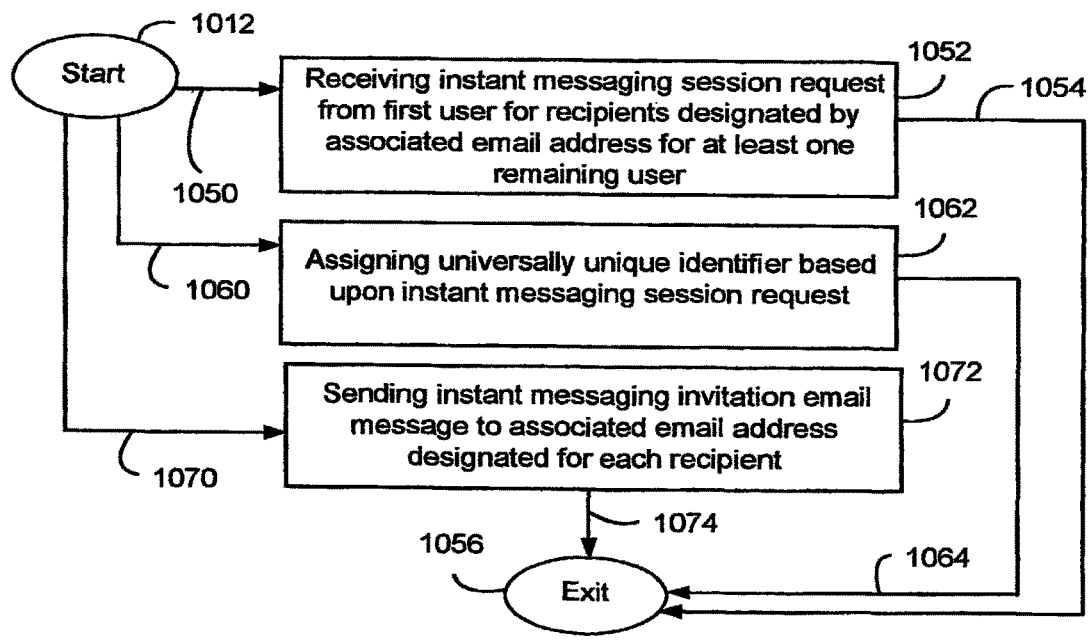
FIG. 2B depicts a detail flowchart of operation 1012 of FIG. 2A for creating the instant messaging session.

FIG. 2B depicts a detail flowchart of operation 1012 of FIG. 2A for creating the instant messaging session.

Arrow 1050 directs the flow of execution from starting operation 1012 to operation 1052. Operation 1052 performs receiving an instant messaging session request from the first user for recipients each designated by an associated email address for the at least one of the remaining users. Arrow 1054 directs execution from operation 1052 to operation 1056. Operation 1056 terminates the operations of this flowchart.

Arrow 1060 directs the flow of execution from starting operation 1012 to operation 1062. Operation 1062 performs assigning the universally unique identifier based upon the instant messaging session request. Arrow 1064 directs execution from operation 1062 to operation 1056. Operation 1056 terminates the operations of this flowchart.

Arrow 1070 directs the flow of execution from starting operation 1012 to operation 1072. Operation 1072 performs sending an instant messaging invitation email message to the associated email address designated for each of the recipients. Arrow 1074 directs execution from operation 1072 to operation 1056. Operation 1056 terminates the operations of this flowchart.

Figure 3:
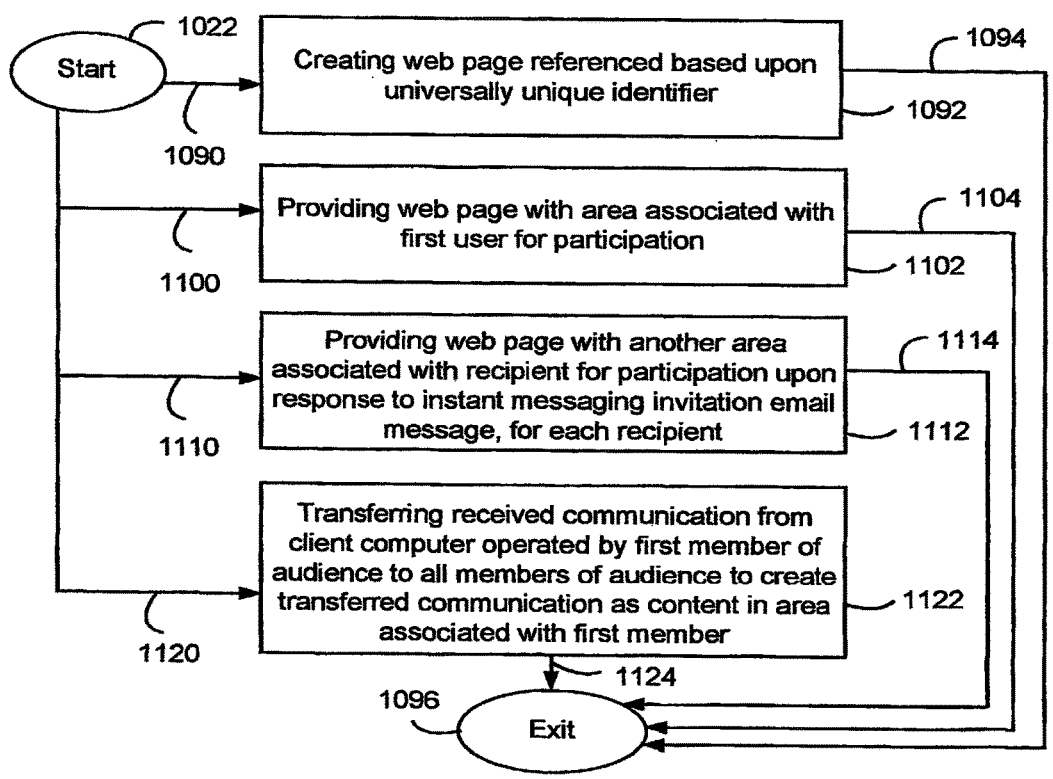
FIG. 3 depicts a detail flowchart of operation 1022 of FIG. 1 for providing the instant messaging session.

FIG. 3 depicts a detail flowchart of operation 1022 of FIG. 1 for providing the instant messaging session.

Arrow 1090 directs the flow of execution from starting operation 1022 to operation 1092. Operation 1092 performs creating the web page referenced based upon the universally unique identifier. Arrow 1094 directs execution from operation 1092 to operation 1096. Operation 1096 terminates the operations of this flowchart.

Arrow 1100 directs the flow of execution from starting operation 1022 to operation 1102. Operation 1102 performs providing the web page with an area associated with the first user for participation. Arrow 1104 directs execution from operation 1102 to operation 1096. Operation 1096 terminates the operations of this flowchart.

Arrow 1110 directs the flow of execution from starting operation 1022 to operation 1112. Operation 1112 performs providing the web page with another area associated with the recipient for participation upon response to the instant messaging invitation email message, for each of the recipients. Arrow 1114 directs execution from operation 1112 to operation 1096. Operation 1096 terminates the operations of this flowchart.

As used herein, an audience collection will include the first user and each of the recipients responding to the instant messaging invitation email message.

Arrow 1120 directs the flow of execution from starting operation 1022 to operation 1122. Operation 1122 performs transferring at least one received communication from the associated client computer operated by a first of the members of the audience collection to all of the members of the audience collection to create a transferred communication as content in the area associated with the first member. Arrow 1124 directs execution from operation 1122 to operation 1096. Operation 1096 terminates the operations of this flowchart.

Figure 4A:
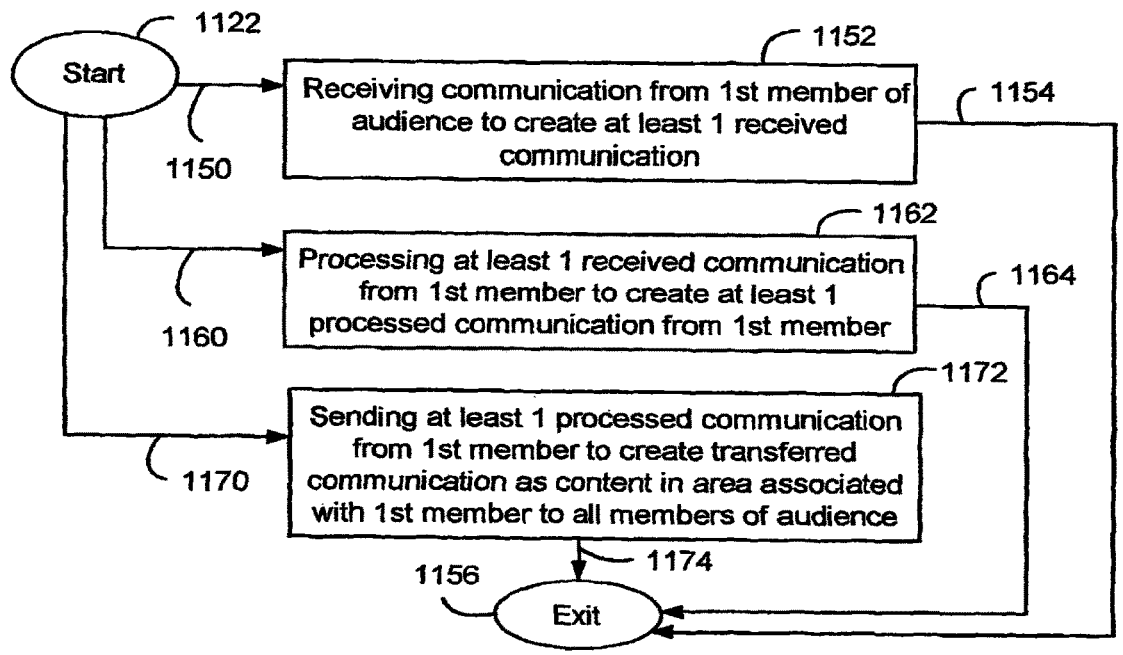
FIG. 4A depicts a detail flowchart of operation 1122 of FIG. 3 for transferring the at least one received communication from the first member.

FIG. 4A depicts a detail flowchart of operation 1122 of FIG. 3 for transferring the at least one received communication from the first member.

Arrow 1150 directs the flow of execution from starting operation 1122 to operation 1152. Operation 1152 performs receiving at least one communication from the first member of the audience collection to create at least one received communication. Arrow 1154 directs execution from operation 1152 to operation 1156. Operation 1156 terminates the operations of this flowchart.

Arrow 1160 directs the flow of execution from starting operation 1122 to operation 1162. Operation 1162 performs processing at least one received communication from the first member to create at least one processed communication from the first member. Arrow 1164 directs execution from operation 1162 to operation 1156. Operation 1156 terminates the operations of this flowchart.

Arrow 1170 directs the flow of execution from starting operation 1122 to operation 1172. Operation 1172 performs sending at least one processed communication from the first member to create the transferred communication as content in the area associated with the first member to all audience collection members. Arrow 1174 directs execution from operation 1172 to operation 1156. Operation 1156 terminates the operations of this flowchart.

Figure 4B:
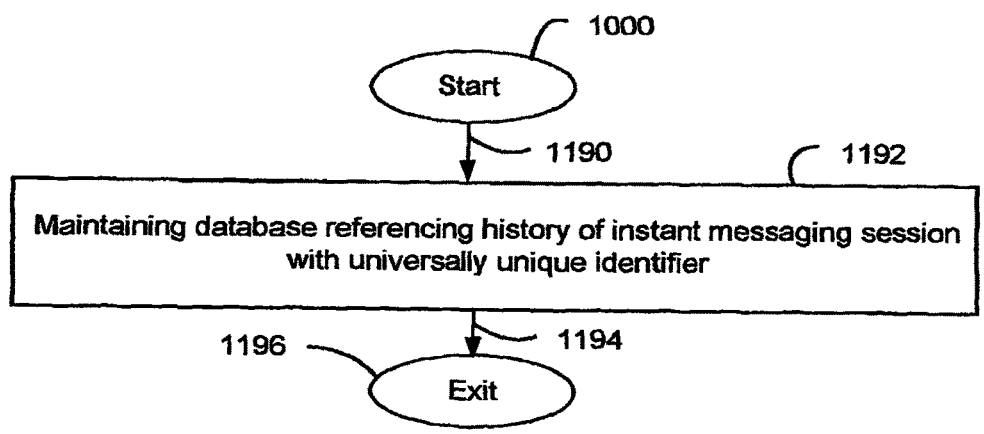
FIG. 4B depicts a detail flowchart of server program system 1000 of FIG. 1 for supporting instant messaging between at least two users.

FIG. 4B depicts a detail flowchart of server program system 1000 of FIG. 1 for supporting instant messaging between at least two users.

Arrow 1190 directs the flow of execution from starting operation 1000 to operation 1192. Operation 1192 performs maintaining a database referencing a history of the instant messaging session with the universally unique identifier. Arrow 1194 directs execution from operation 1192 to operation 1196. Operation 1196 terminates the operations of this flowchart.

Figure 5A:
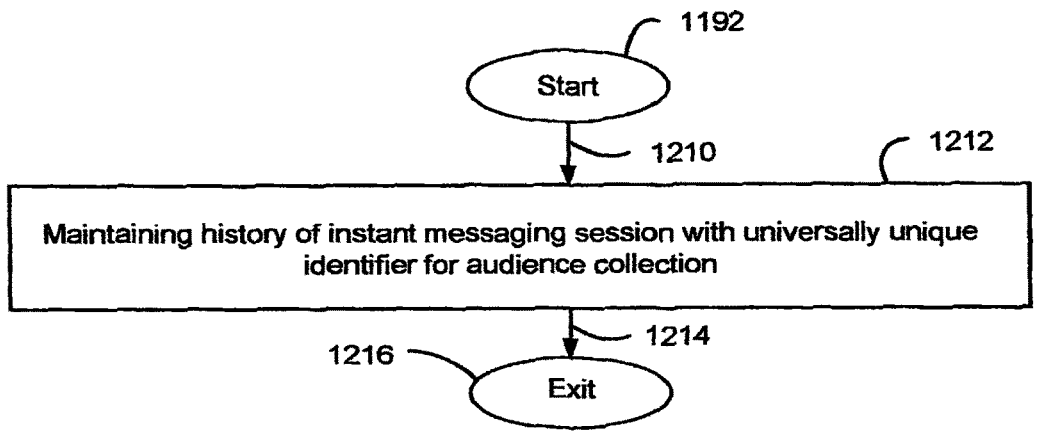
FIG. 5A depicts a detail flowchart of operation 1192 of FIG. 4B for maintaining the database referencing the history.

FIG. 5A depicts a detail flowchart of operation 1192 of FIG. 4B for maintaining the database referencing the history.

Arrow 1210 directs the flow of execution from starting operation 1192 to operation 1212. Operation, 1212 performs maintaining the history of the instant messaging session with the universally unique identifier for the audience collection.

Arrow 1214 directs execution from operation 1212 to operation 1216. Operation 1216 terminates the operations of this flowchart.

Figure 5B:
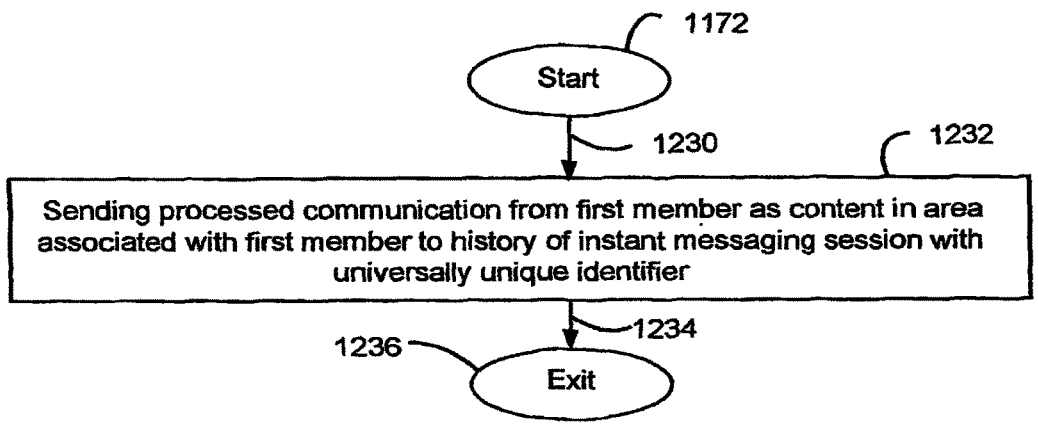
FIG. 5B depicts a detail flowchart of operation 1172 of FIG. 4A for sending the at least one processed communication from the first member.

FIG. 5B depicts a detail flowchart of operation 1172 of FIG. 4A for sending at least one processed communication from the first member.

Arrow 1230 directs the flow of execution from starting operation 1172 to operation 1232. Operation 1232 performs sending the processed communication from the first member as content in the area associated with the first member to the history of the instant messaging session with the universally unique identifier. Arrow 1234 directs execution from operation 1232 to operation 1236. Operation 1236 terminates the operations of this flowchart.

Figure 5C:
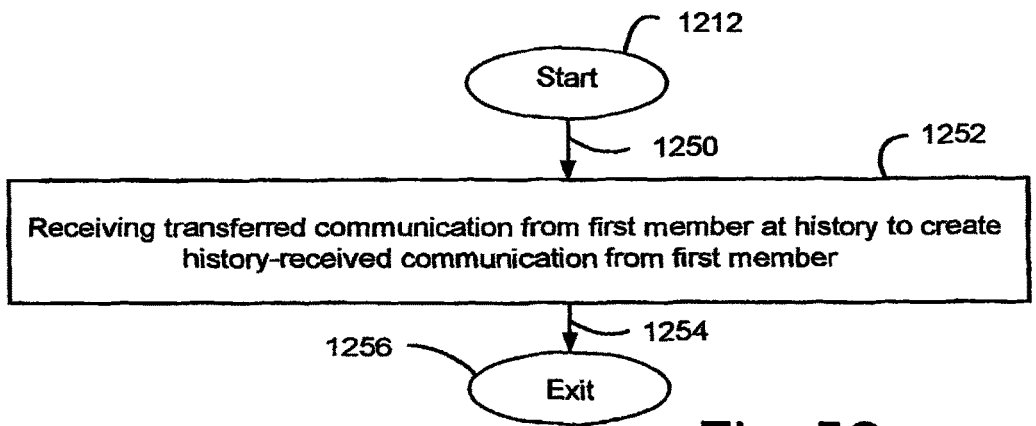
FIG. 5C depicts a detail flowchart of operation 1212 of FIG. 5A for maintaining the history.

FIG. 5C depicts a detail flowchart of operation 1212 of FIG. 5A for maintaining the history.

Arrow 1250 directs the flow of execution from starting operation 1212 to operation 1252. Operation 1252 performs receiving the transferred communication from the first member at the history to create a history-received communication from the first member. Arrow 1254 directs execution from operation 1252 to operation 1256. Operation 1256 terminates the operations of this flowchart.

Figure 6:
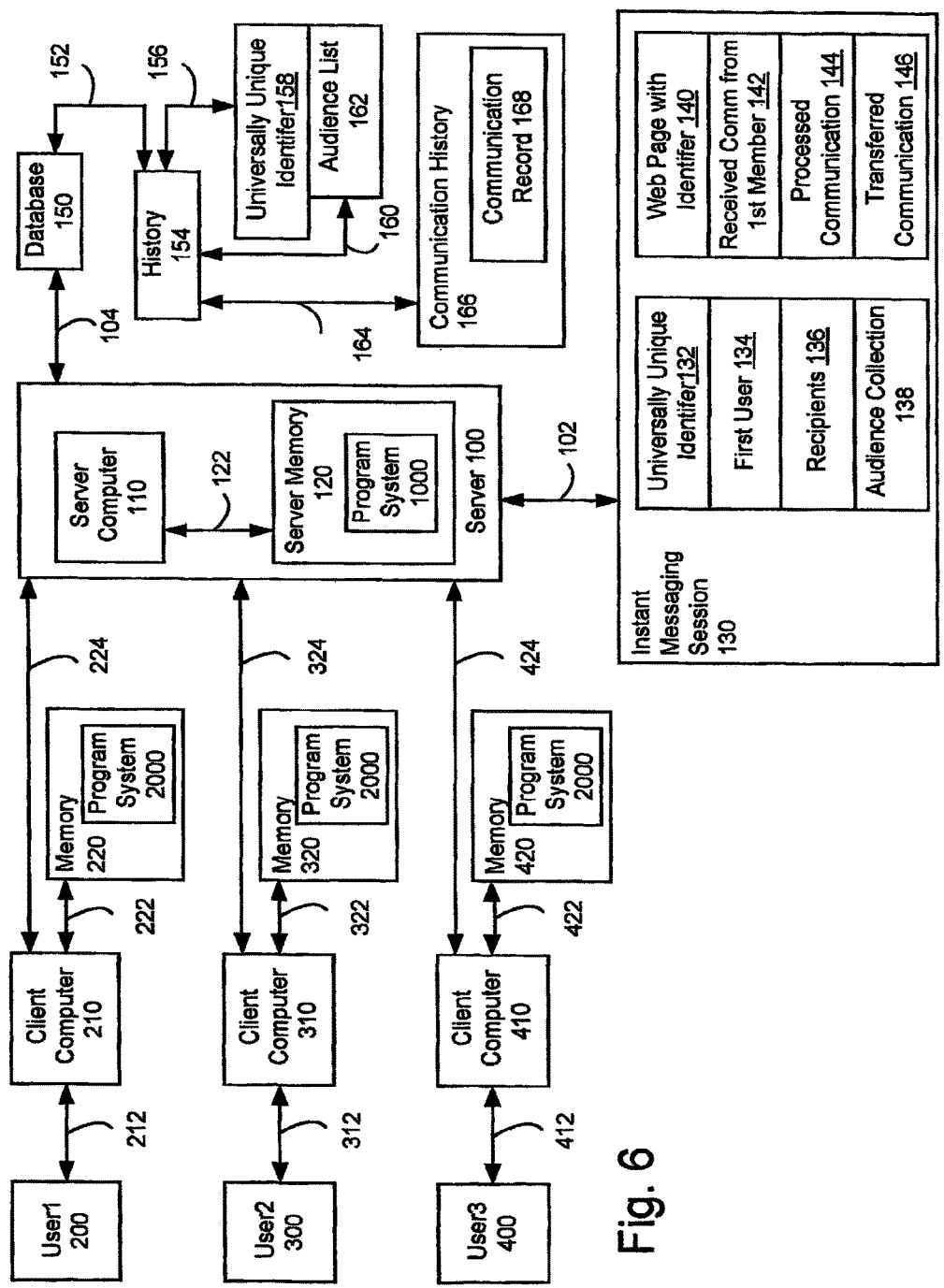
FIG. 6 is a refinement of FIG. 1 showing server 100 coupled 102 to instant messaging session 130 and further coupled 104 to database 150.

FIG. 6 is a refinement of FIG. 1 showing server 100 coupled 102 to instant messaging session 130 and further coupled 104 to database 150.

Note that in certain embodiments of the invention, there is no database 150, when it is required that no lasting record of the instant messaging session is kept. Such embodiments enforce the instant messaging session confidentiality cannot be broken at a later time.

When there is a database 150, it references 152 history 154 of the instant messaging session 130. History 154 may reference 156 universally unique identifier 158, which is based upon universally unique identifier 132 of instant messaging session 130. Note that history 154 may persist after instant messaging session 130 has ended. In some circumstances, history 154 may be built from instant messaging session 130. Such a build process may occur when the session was initiated or later, possibly when the session ends.

History 154 may also reference 160 audience list 162 based upon audience collection 138.

History 154 may also reference 164 a communication history 166, which further references communications records 168, each of which may be based upon at least one of the received communication 142, processed communication 144, and transferred communication 146.

Depending upon the options the initial sender 134 setup when Instant Messaging session 130 was initiated, the server 100 may retain the complete transcript 166 of the Instant Messaging session.

This is a simple matter for server 100 to do, since each and every Instant Messaging 130 has a unique ID 132. Communication 142 between users 200, 300, and 400 must pass through the server 100 prior to delivery and is uniquely bound to its Instant Messaging session 130 via a unique ID 132.

This is a powerful feature, in that the URL contained in the email initiating the whole Instant Messaging session 130 always contains that unique ID 132. The user whenever looking at that email at any time in the future, will trigger the server 100 to attempt fetching all the Instant Messaging messages 168 has stored for that email. The email will then continue to display to the user the complete Instant Messaging transcript associated with the email.

Figure 7A:
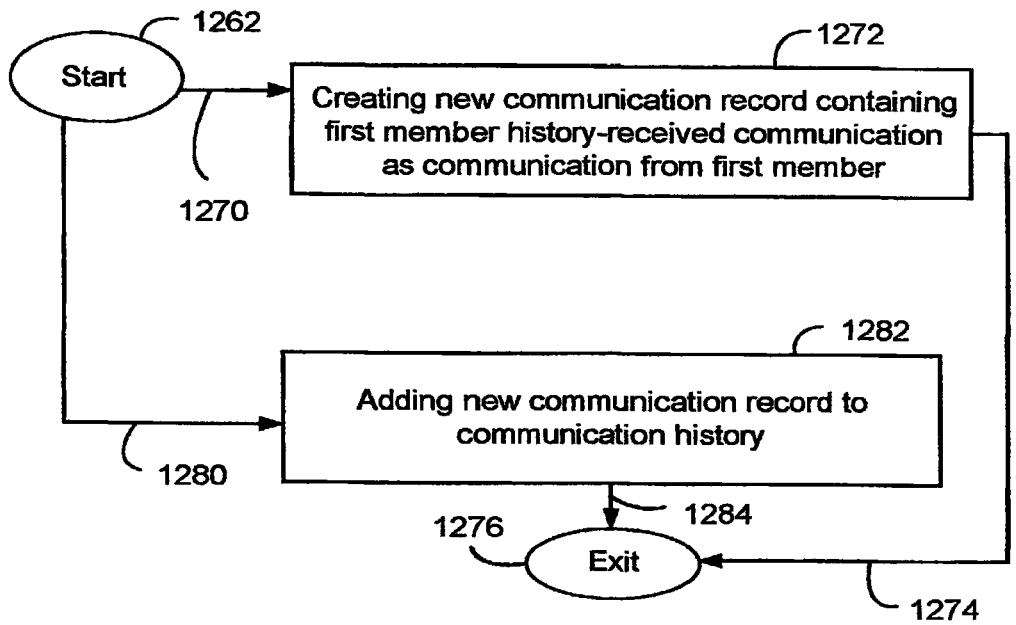
FIG. 7A depicts a detail flowchart of operation 1262 of FIG. 5C for maintaining the communication history.

FIG. 7A depicts a detail flowchart of operation 1262 of FIG. 5C for maintaining the communication history.

Arrow 1270 directs the flow of execution from starting operation 1262 to operation 1272. Operation 1272 performs creating a new communication record containing the first member history-received communication as the communication from the first member. Arrow 1274 directs execution from operation 1272 to operation 1276. Operation 1276 terminates the operations of this flowchart.

Arrow 1280 directs the flow of execution from starting operation 1262 to operation 1282. Operation 1282 performs adding the new communication record to the communication history. Arrow 1284 directs execution from operation 1282 to operation 1276. Operation 1276 terminates the operations of this flowchart.

Figure 7B:
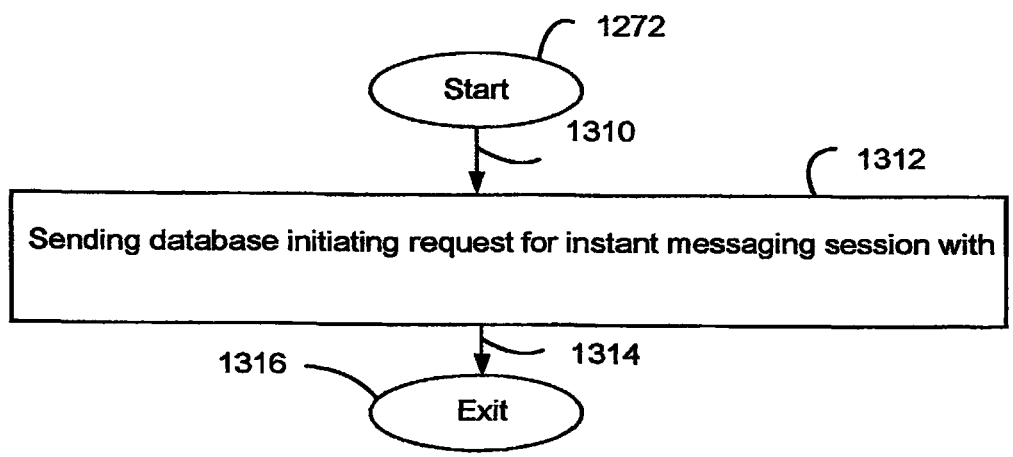
FIG. 7B depicts a detail flowchart of operation 1272 of FIG. 7A for creating the instant messaging session with the universally unique identifier.

FIG. 7B depicts a detail flowchart of operation 1272 of FIG. 7A for creating the instant messaging session with the universally unique identifier.

Arrow 1310 directs the flow of execution from starting operation 1272 to operation 1312. Operation 1312 performs sending the database an initiating request for the instant messaging session with the universally unique identifier by the first user for the recipients. Arrow 1314 directs execution from operation 1312 to operation 1316. Operation 1316 terminates the operations of this flowchart.

FIG. 7C depicts a detail flowchart of operation 1192 of FIG. 4B for maintaining the database.

Arrow 1330 directs the flow of execution from starting operation 1192 to operation 1332. Operation 1332 performs receiving the initiating request for the instant messaging session with the universally unique identifier by the first user for the recipients at the database. Arrow 1334 directs execution from operation 1332 to operation 1336. Operation 1336 terminates the operations of this flowchart.

Arrow 1340 directs the flow of execution from starting operation 1192 to operation 1342. Operation 1342 performs creating the history of the instant messaging session with the universally unique identifier from the initiating request for the instant messaging session with the universally unique identifier by the first user for the recipients. Arrow 1344 directs execution from operation 1342 to operation 1346. Operation 1346 terminates the operations of this flowchart.

Figure 8A:
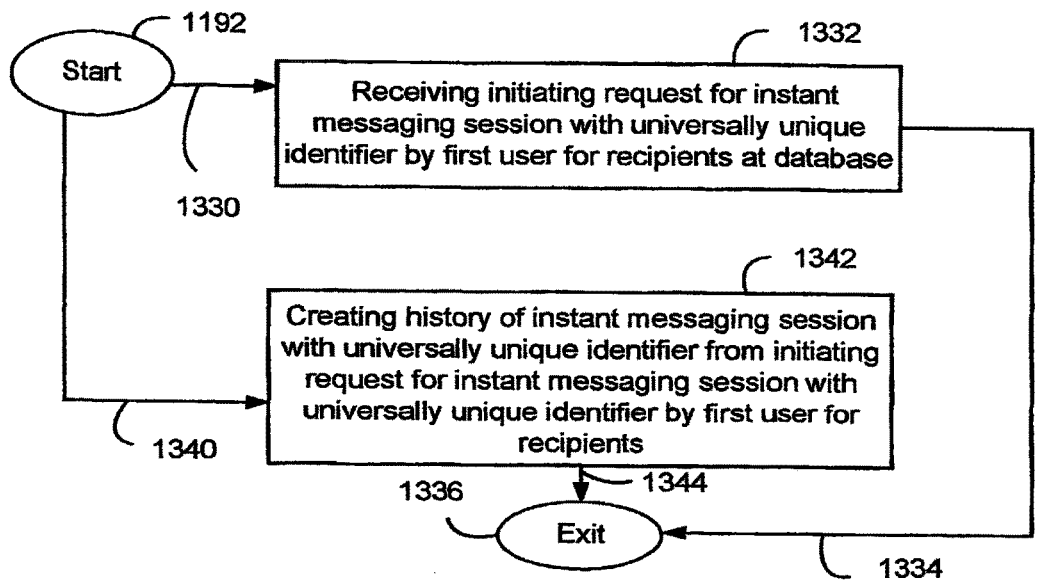
FIG. 8A depicts a detail flowchart of operation 1192 of FIG. 4B for maintaining the database.
Figure 8B:
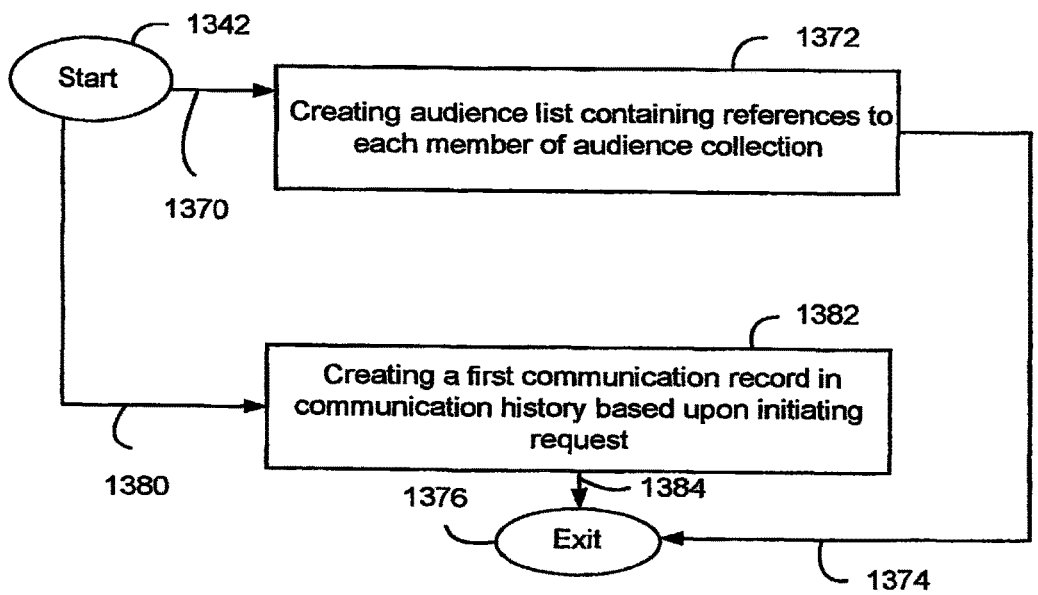
FIG. 8B depicts a detail flowchart of operation 1342 of FIG. 8A for creating the history.

FIG. 8B depicts a detail flowchart of operation 1342 of FIG. 8A for creating the history.

Arrow 1370 directs the flow of execution from starting operation 1342 to operation 1372. Operation 1372 performs creating an audience list containing references to each member of the audience collection. Arrow 1374 directs execution from operation 1372 to operation 1376. Operation 1376 terminates the operations of this flowchart.

Arrow 1380 directs the flow of execution from starting operation 1342 to operation 1382. Operation 1382 performs creating a first of the communication records in the communication history based upon the initiating request. Arrow 1384 directs execution from operation 1382 to operation 1376. Operation 1376 terminates the operations of this flowchart.

Note that various embodiments of the invention may implement one or both of the operations of FIG. 8B.

Figure 9:
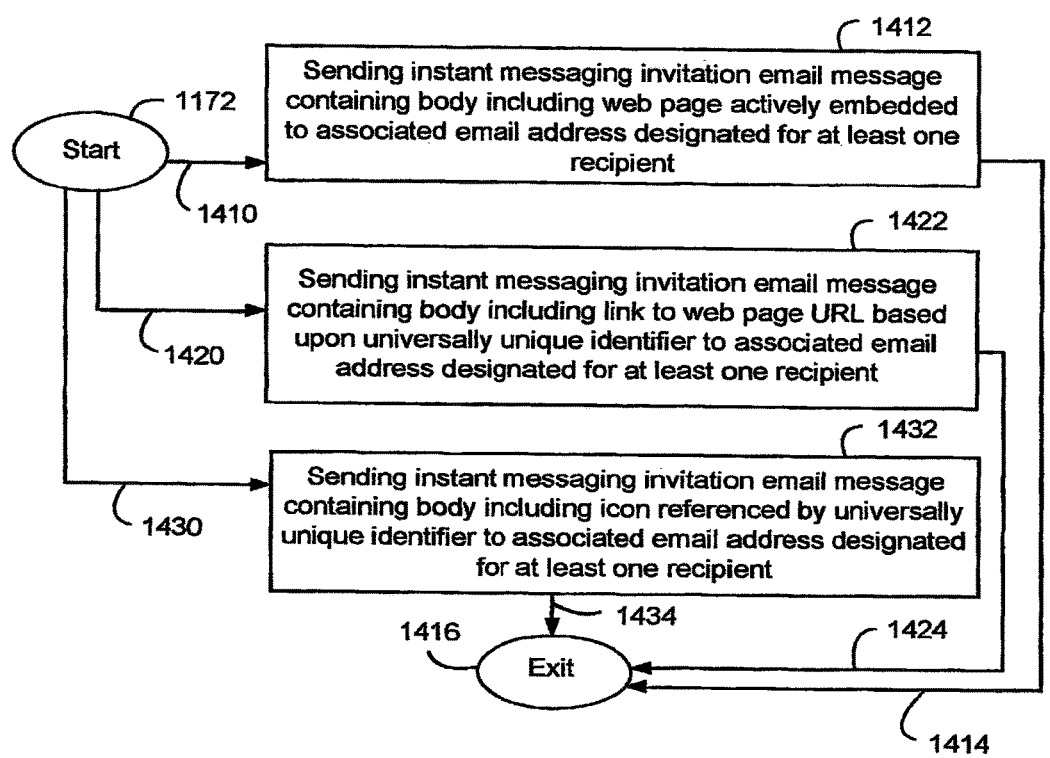
FIG. 9 depicts a detail flowchart of operation 1172 of FIG. 4A for sending the instant messaging invitation email message to the associated email address designated for each of the recipients.

FIG. 9 depicts a detail flowchart of operation 1172 of FIG. 4A for sending the instant messaging invitation email message to the associated email address designated for each of the recipients.

Arrow 1410 directs the flow of execution from starting operation 1172 to operation 1412. Operation 1412 performs sending the instant messaging invitation email message containing a body further including the web page referenced by the universally unique identifier actively embedded in the body to the associated email address designated for at least one of the recipients. Arrow 1414 directs execution from operation 1412 to operation 1416. Operation 1416 terminates the operations of this flowchart.

Arrow 1420 directs the flow of execution from starting operation 1172 to operation 1422. Operation 1422 performs sending the instant messaging invitation email message containing a body further including a link to the web page referenced by a URL based upon the universally unique identifier to the associated email address designated for at least one of the recipients. Arrow 1424 directs execution from operation 1422 to operation 1416. Operation 1416 terminates the operations of this flowchart.

Arrow 1430 directs the flow of execution from starting operation 1172 to operation 1432. Operation 1432 performs sending the instant messaging invitation email message containing a body further including an icon referenced by the universally unique identifier to the associated email address designated for at least one of the recipients. Arrow 1434 directs execution from operation 1432 to operation 1416. Operation 1416 terminates the operations of this flowchart.

Note that in various situations, a combination of the operations of FIG. 9 may be performed to send instant messaging invitations to a collection of recipients.

An email with an integrated Instant Message may be created in one of two methods:

The first method uses a web based email program including a typical email "body", an area for users to Instant Message each other, and a unique identifier (ID) 132 appended to the URL of the email, and serves to differentiate this email (and potential Instant Messaging session) from all others.

The second method uses a supported 3rd-party client email program, such as Microsoft Outlook, Eudora and Netscape Communicator. Under this scenario an "Embeddable IM" icon may added to the email program's toolbar, allowing users to drag the icon down and "drop" it into their email.

This invokes software embedding a URL to the Instant Messaging facility in the client's email. This URL is based upon unique identifier 132.

In either case, the URL which is generated, either for the web based email, or as an Instant Messaging URL inserted into a "standard" email, will be tagged with an ID 132 for the sender and with a flag indicating that it is an "email IM". In this way the recipient is supported in Instant Messaging with the sender regardless of which users the sender has given "presence detection" permission to.

In any case, the sender's email address must also be included as part of the email (or server form submission). This is so that when the recipient responds the response can be correctly routed to the sender. This can be viewed as a return address. The very first time that a user sends an IM-enriched email they may have to type in their email address, but after that the email address may preferably be stored in a cookie on their computer so that all subsequent Instant Messaging emails can automatically contain it.

When responding to IM-enriched emails, the recipient's email address must be included with the IM, either in the URL or the Instant Messaging itself. This is the recipient's return address and is required for the same reasons above. The return address will be obtained from the recipient as described above.

If an email is sent in the first method, the email body is sent by the client browser code up to the server computer 110. Server computer 110 then may preferably store this email message in the server-side database 150, allowing for future retrieval via URL.

When the recipient receives an email via either of the methods described above, it contains a standard email subject line and body, but may preferably contains a text area allowing the recipient to communicate with the sender.

If the recipient chooses not to communicate with the sender, no further action is taken, and the email may be handled/disposed of as the client user wishes.

If the recipient does choose to utilize the preferably built-in instant messaging feature, they simply input their message into the text area, and activate a Send button near the text area. This preferably causes client-side DHTML (HTML and JavaScript) to be invoked sending the message, via HTTP, back to the server computer 110.

Upon receiving this client request 1152, the server preferably checks the database 150 to see if it recognizes any Instant Messaging sessions 130 with that particular ID 132.

If it does, it preferably associates this message 142 with that unique ID, and stores it in the server-side database in some form 168. This approach allows the system to operate on virtually any hardware platform, operate through firewalls, etc.

Normally, when an Instant Messaging is received 1152 by the server computer 110, it compares the source of the email against the target user's the Instant Messaging list of acceptable senders, and only delivers the Instant Messaging if the target user is willing to accept it.

The exception to occurs when an Instant Messaging comes in from an email source. The server computer 110 knows that the message is coming from an email source, because when the Instant Messaging URL 140 was first generated for insertion into the email, the URL was tagged with an ID 132 for the sender and with a flag indicating that it is an "email IM". In this case, the server 100 knows that the recipient is allowed to Instant Messaging with the sender regardless of which users the sender has given "presence detection" permission to. If the recipient does not have permission to detect the sender's presence using standalone software, they would still not be able to do that. They would only be able to participate in instant Messaging with the sender within the context of this particular email message.

The ability to temporarily disable presence detection restrictions allows individuals like the sender to maintain a high degree of overall privacy without making it cumbersome to disable the privacy feature when having specific conversations with specific individuals. The procedure is not cumbersome because the act of sending the email automatically and implicitly grants the recipient Instant Messaging permissions in this particular case.

From the sender's side, if the sender of the email is using the standalone web page version of the Instant Messaging software, that standalone client software is constantly (every few seconds) making HTTP requests to the server asking if any new data has arrived for it. The server makes a note of the last time the client made such a request of it. On one of these requests, after the server has received an Instant Messaging from the recipient and stored it in the database, the server computer responds to the sending client's request with any newly received IMs. The server then marks those IMs in the database as "delivered".

If the sender of the email does not have the standalone web page version of the Instant Messaging software running, then when the server gets the Instant Messaging from the email recipient, it notices that the email sender's client software has not asked it for any messages in too long of a period of time (i.e. it has not been making requests every few seconds).

The server knows this since it keeps track of client data requests. In such a case, the server automatically composes an email and sends it to the Instant Messaging target user. The email contains the IM, as well as the standard Instant Messaging text area so that when the email is received, the Instant Messaging session may commence directly from the received email. Under this scenario, both client users are utilizing the software via email.

Following all of the above, the sender can Instant Messaging a response back to the recipient, and the same process takes place again, in reverse.

Figure 10A:
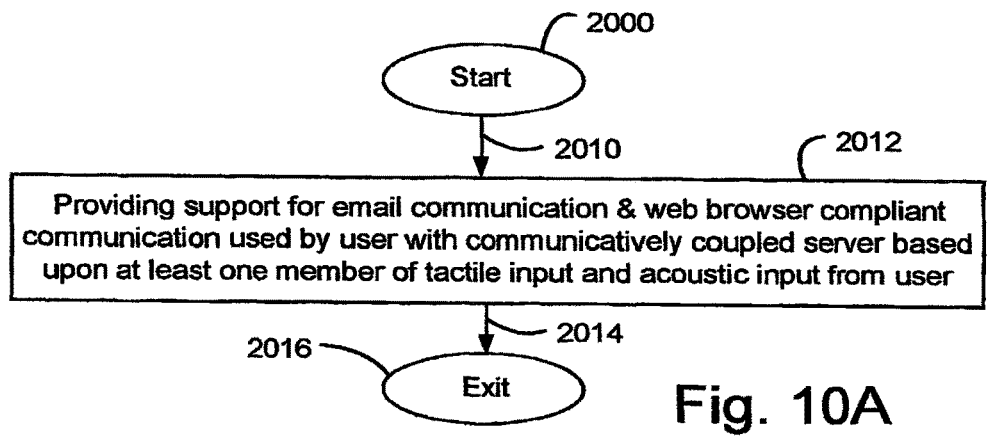
FIG. 10A depicts a detail flowchart of client program system 2000 of FIGS. 1 and 6 for controlling the associated client computer based upon the use by the user and the communicatively coupled server 100.

FIG. 10A depicts a detail flowchart of client program system 2000 of FIGS. 1 and 6 for controlling the associated client computer based upon the use by the user and the communicatively coupled server 100.

Arrow 2010 directs the flow of execution from starting operation 2000 to operation 2012. Operation 2012 performs providing support for email communication and for web browser compliant communication used by the user with the communicatively coupled server based upon at least one of tactile input from the user and acoustic input from the user. Arrow 2014 directs execution from operation 2012 to operation 2016. Operation 2016 terminates the operations of this flowchart.

Figure 10B:
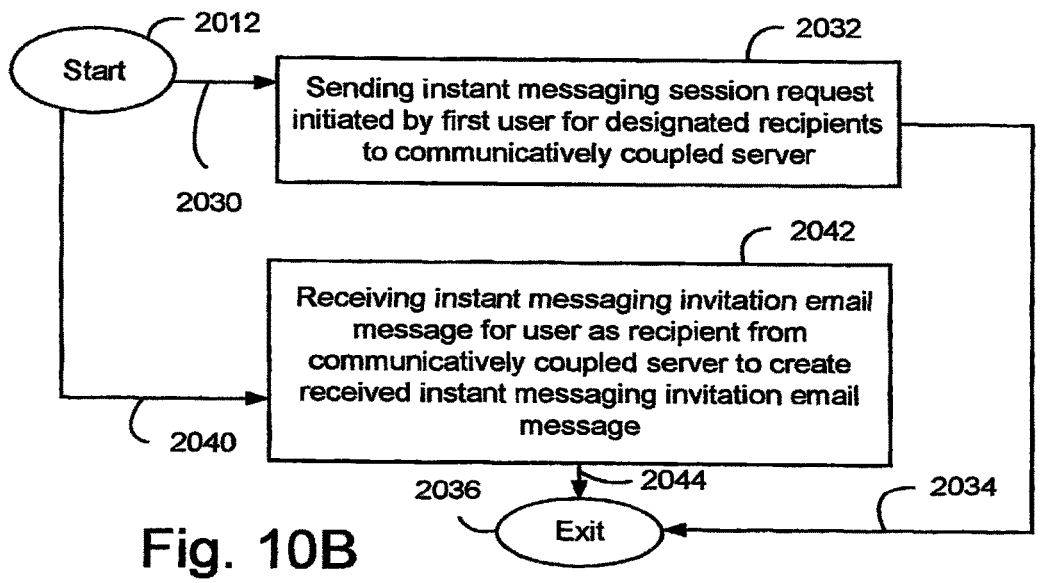
FIG. 10B depicts a detail flowchart of operation 2012 of FIG. 10A for support of email and web browser compliant communication.

FIG. 10B depicts a detail flowchart of operation 2012 of FIG. 10A for support of email and web browser compliant communication.

Arrow 2030 directs the flow of execution from starting operation 2012 to operation 2032. Operation 2032 performs sending the instant messaging session request initiated by the first user for the designated recipients to the communicatively coupled server. Arrow 2034 directs execution from operation 2032 to operation 2036. Operation 2036 terminates the operations of this flowchart.

Arrow 2040 directs the flow of execution from starting operation 2012 to operation 2042. Operation 2042 performs receiving the instant messaging invitation email message for the user as the recipient from the communicatively coupled server to create a received instant messaging invitation email message. Arrow 2044 directs execution from operation 2042 to operation 2036. Operation 2036 terminates the operations of this flowchart.

Various embodiments of the invention may support one or both of the operations 2032 and 2042 operating the associated client computer used one of the users.

Figure 10C:
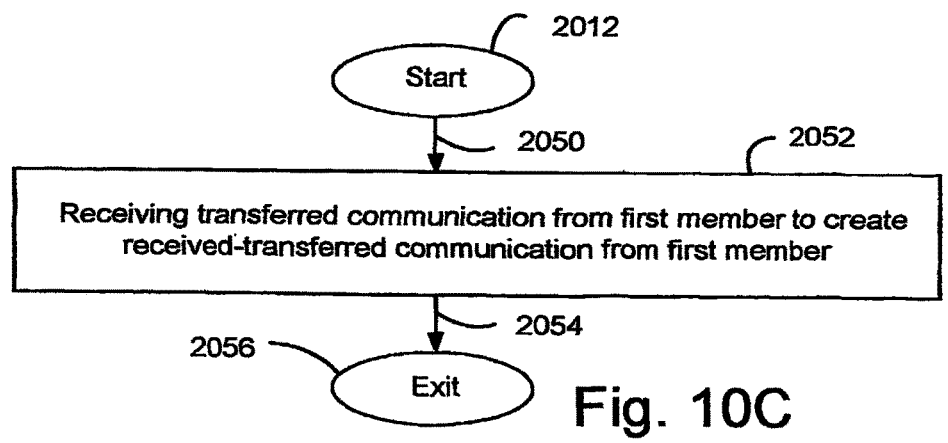
FIG. 10C depicts a detail flowchart of operation 2012 of FIG. 10A for providing support for email communication and for web browser compliant communication.

FIG. 10C depicts a detail flowchart of operation 2012 of FIG. 10A for providing support for email communication and for web browser compliant communication.

Arrow 2050 directs the flow of execution from starting operation 2012 to operation 2052. Operation 2052 performs receiving the transferred communication from the first member to create a received-transferred communication from the first member. Arrow 2054 directs execution from operation 2052 to operation 2056. Operation 2056 terminates the operations of this flowchart.

Figure 11A:
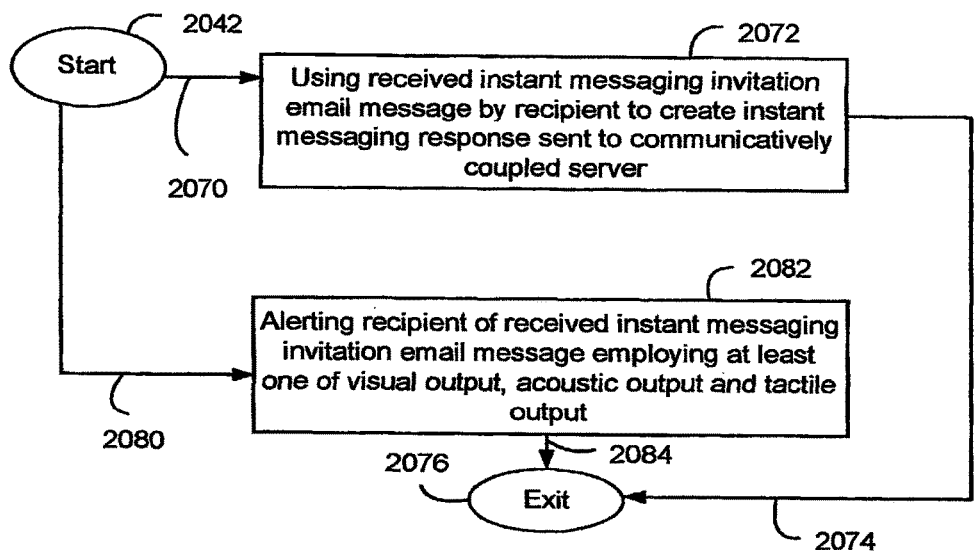
FIG. 11A depicts a detail flowchart of operation 2042 of FIG. 10B for receiving the instant messaging invitation email message.

FIG. 11A depicts a detail flowchart of operation 2042 of FIG. 10B for receiving the instant messaging invitation email message.

Arrow 2070 directs the flow of execution from starting operation 2042 to operation 2072. Operation 2072 performs using the received instant messaging invitation email message by the recipient to create an instant messaging response sent to the communicatively coupled server. Arrow 2074 directs execution from operation 2072 to operation 2076. Operation 2076 terminates the operations of this flowchart.

Arrow 2080 directs the flow of execution from starting operation 2042 to operation 2082. Operation 2082 performs alerting the recipient of the received instant messaging invitation email message employing at least one member of a user output collection including visual output, acoustic output and tactile output. Arrow 2084 directs execution from operation 2082 to operation 2086. Operation 2086 terminates the operations of this flowchart.

Figure 11B:
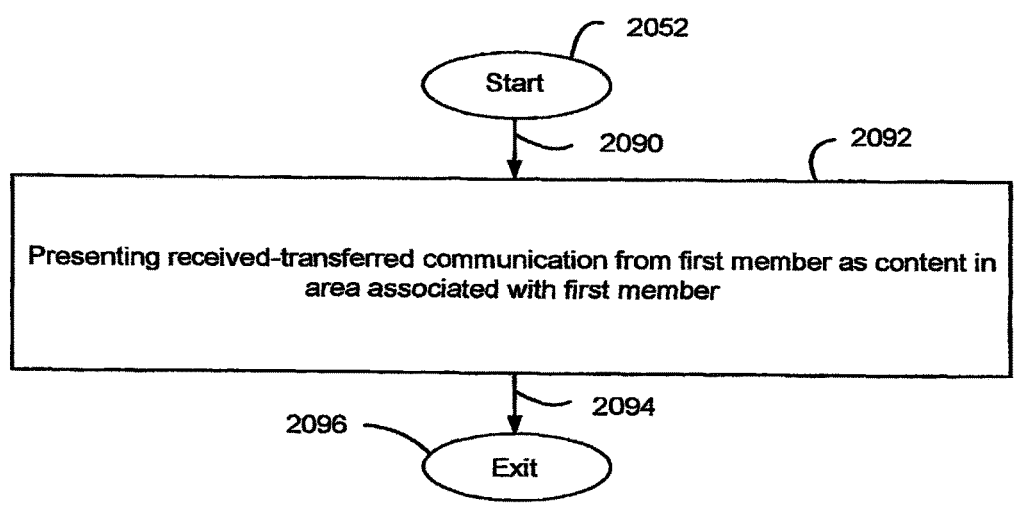
FIG. 11B depicts a detail flowchart of operation 2052 of FIG. 10C for receiving the transferred communication.

FIG. 11B depicts a detail flowchart of operation 2052 of FIG. 10C for receiving the transferred communication.

Arrow 2090 directs the flow of execution from starting operation 2052 to operation 2092. Operation 2092 performs presenting the received-transferred communication from the first member as content in the area associated with the first member. Arrow 2094 directs execution from operation 2092 to operation 2096. Operation 2096 terminates the operations of this flowchart.

Figure 12A:
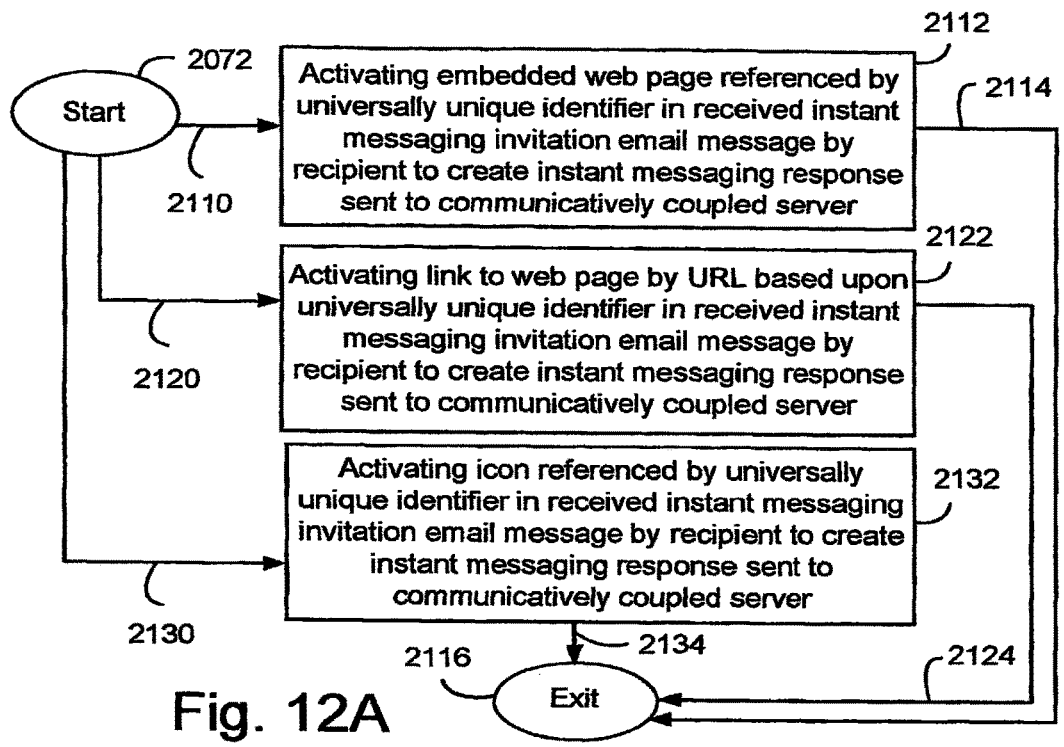
FIG. 12A depicts a detail flowchart of operation 2072 of FIG. 11A for using the received instant messaging invitation email message by the recipient.

FIG. 12A depicts a detail flowchart of operation 2072 of FIG. 11A for using the received instant messaging invitation email message by the recipient.

Arrow 2110 directs the flow of execution from starting operation 2072 to operation 2112. Operation 2112 performs activating the embedded web page referenced by the universally unique identifier contained in the received instant messaging invitation email message by the recipient to create an instant messaging response sent to the communicatively coupled server. Arrow 2114 directs execution from operation 2112 to operation 2116. Operation 2116 terminates the operations of this flowchart.

Arrow 2120 directs the flow of execution from starting operation 2072 to operation 2122. Operation 2122 performs activating the link to the web page referenced by the URL based upon the universally unique identifier contained in the received instant messaging invitation email message by the recipient to create an instant messaging response sent to the communicatively coupled server. Arrow 2124 directs execution from operation 2122 to operation 2116. Operation 2116 terminates the operations of this flowchart.

Arrow 2130 directs the flow of execution from starting operation 2072 to operation 2132. Operation 2132 performs activating the icon referenced by the universally unique identifier contained in the received instant messaging invitation email message by the recipient to create an instant messaging response sent to the communicatively coupled server. Arrow 2134 directs execution from operation 2132 to operation 2116. Operation 2116 terminates the operations of this flowchart.

Figure 12B:
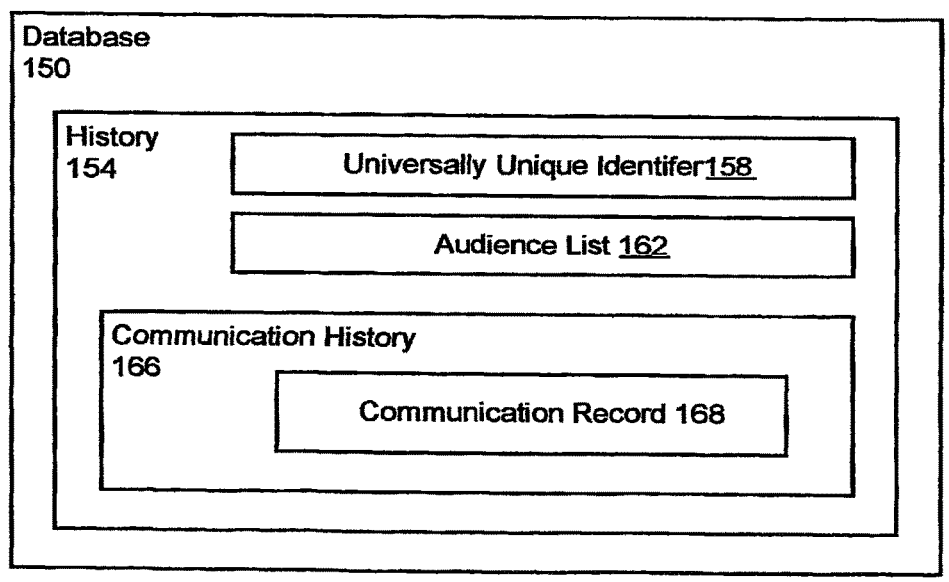
FIG. 12B shows a refinement of the relationships involved with database 150 of FIG. 6 regarding references involved with it and its components.

FIG. 12B shows a refinement of the relationships involved with database 150 of FIG. 6 regarding references involved with it and its components.

In certain embodiments of the invention, database 150 may contain history 154 of the instant messaging session 130.

History 154 may contain the referenced universally unique identifier 158 based upon universally unique identifier 132 of instant messaging session 130.

History 154 may contain referenced audience list 162 based upon audience collection 138.

History 154 may also contain the referenced communication history 166, which further contain the referenced communications records 168, each of which may be based upon at least one of the received communication 142, processed communication 144, and transferred communication 144.

Note that for the sake of simplicity of discourse, these references are all shown individually as container relationships, though in practice any combination of them may be container relationships. Note that in other embodiments, these referenced relationships may be part of an inferential database 150, where the relationships are of an implicative rather than container basis.

Figure 13:
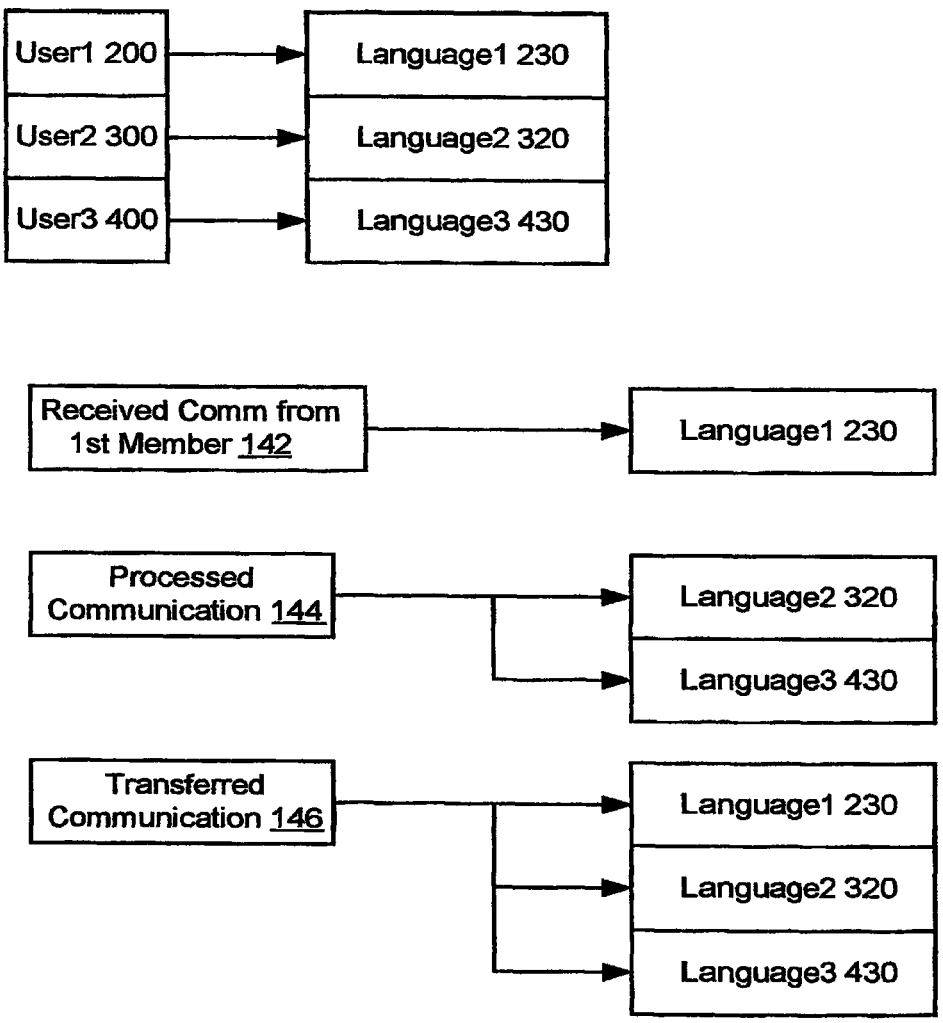
FIG. 13 depicts an application of the instant messaging system in a situation where different users prefer multiple languages.

FIG. 13 depicts an application of the instant messaging system in a situation where different users prefer multiple languages.

Note that in certain embodiments of the invention, at least two members of the audience collection may have at least one associated language. Collectively, the communications between members of the audience collection may require more than one language.

As an example, assume that user1 200 prefers language 230, user2 300 prefers language 330 and users 400 prefers language 430, which are different. These distinct languages may be differing versions of the same basic human language, or may differ in terms of the basic human languages. Note that as used herein, a basic language such as English may have several versions, such as US, UK and Australian English.

Note that the received communication 142 may be in first language 230, and that the processed communication 144 may be in at least a second language 330. The processed communication may be more than one language, by way of example, a third language 430.

Note that the transferred communication 146 would involve all the languages preferred by the audience collection members.

The preceding embodiments have been provided by way of example and are not meant to constrain the scope of the following claims.

What is claimed is:

1. A method comprising:
identifying, from a plurality of messages of a first type, at least one message of the first type between a first user and a second user;
providing to the first user, within a graphical user interface associated with the at least one message of the first type, an option for the first user to initiate a message of a second type with the second user; and
in response to a selection of the option by the first user:
determining a universally unique identifier;
generating a uniform resource locator including the universally unique identifier;
initiating a messaging session for the message of the second type; and
assigning the uniform resource locator to the messaging session for the message of the second type.

2. The method as recited in claim 1, further comprising generating a web page at the uniform resource locator comprising a transcript of the messaging session for the message of the second type.

3. The method as recited in claim 1, wherein the universally unique identifier is associated with the at least one message of the first type between the first user and the second user.

4. The method as recited in claim 1, further comprising, upon initiating the messaging session for the message of the second type, enabling capture of data representative of one or more messages of the second type exchanged between the first user and the second user during the messaging session.

5. The method as recited in claim 4, further comprising storing, based on the universally unique identifier, the captured data representative of the one or more messages of the second type exchanged between the first user and the second user.

6. The method as recited in claim 5, wherein storing the captured data representative of the one or more messages of the second type further comprises storing data representative of the at least one message of the first type.

7. The method as recited in claim 6, further comprising determining identifying information for the first user and the second user from data representative of the at least one message of the first type.

8. The method as recited in claim 7, wherein storing the captured data representative of the one or more messages of the second type further comprises storing the identifying information for the first user and the second user.

9. The method as recited in claim 1, wherein the at least one message of the first type is an email message and the message of the second type is an instant message.

10. A system comprising:
at least one processor; and
at least one non-transitory computer-readable storage medium storing instructions thereon that, when executed by the at least one processor, cause the system to:
identify, from a plurality of message of a first type, at least one message of the first type between a first user and a second user;
provide to the first user, within a graphical user interface associated with the at least one message of the first type, an option for the first user to initiate a message of a second type with the second user; and
in response to a selection of the option by the first user:
determine a universally unique identifier;
generate a uniform resource locator including the universally unique identifier;
initiate a messaging session for the message of the second type; and
assign the uniform resource locator to the messaging session for the message of the second type.

11. The system as recited in claim 10, further comprising instructions that when executed by the at least one processor, cause the system to generate a web page at the uniform resource locator comprising a transcript of the messaging session for the message of the second type.

12. The system as recited in claim 11, further comprising instructions that when executed by the at least one processor, cause the system to, upon initiating the messaging session for the message of the second type, enable capture of data representative of one or more messages of the second type exchanged between the first user and the second user during the messaging session.

13. The system as recited in claim 12, further comprising instructions that when executed by the at least one processor, cause the system to store, based on the universally unique identifier, the captured data representative of the one or more messages of the second type exchanged between the first user and the second user.

14. The system as recited in claim 13, wherein the instructions, when executed by the at least one processor, cause the system to store the captured data representative of the one or more messages of the second type by storing data representative of the at least one message of the first type.

15. The system as recited in claim 14, further comprising instructions that when executed by the at least one processor, cause the system to determine identifying information for the first user and the second user from the data representative of the at least one message of the first type.

16. The system as recited in claim 15, wherein the instructions, when executed by the at least one processor, cause the system to store the captured data representative of one or more messages of the second type and the data representative of the at least one message of the first type by storing the identifying information for the first user and the second user.

17. A non-transitory computer-readable medium storing instructions thereon that, when executed by at least one processor, cause a computer system to:
 identify, from a plurality of message of a first type, at least one message of the first type between a first user and a second user;
 provide to the first user, within a graphical user interface associated with the at least one message of the first type, an option for the first user to initiate a message of a second type with the second user; and
 in response to a selection of the option by the first user:
  determine a universally unique identifier;
  generate a uniform resource locator including the universally unique identifier;
  initiate a messaging session for the message of the second type; and
  assign the uniform resource locator to the messaging session for the message of the second type.

18. The non-transitory computer-readable medium as recited in claim 17, further comprising instructions that when executed by the at least one processor, cause the computer system to generate a web page at the uniform resource locator comprising a transcript of the messaging session for the message of the second type.

19. The non-transitory computer-readable medium as recited in claim 18, further comprising instructions that when executed by the at least one processor, cause the computer system to, upon initiating the messaging session for the message of the second type:
 enable capture of data representative of one or more messages of the second type exchanged between the first user and the second user during the messaging session;
 store, based on the universally unique identifier, the captured data representative of the one or more messages of the second type exchanged between the first user and the second user; and
 store, based on the universally unique identifier, data representative of the at least one message of the first type.

20. The non-transitory computer-readable medium as recited in claim 19, further comprising instructions that when executed by the at least one processor, cause the computer system to:
 determine identifying information for the first user and the second user from the data representative of the at least one message of the first type; and
 store, based on the universally unique identifier, the identifying information for the first user and the second user.

* * * * *